(12) United States Patent
Islam et al.

(10) Patent No.: US 7,197,245 B1
(45) Date of Patent: Mar. 27, 2007

(54) SYSTEM AND METHOD FOR MANAGING SYSTEM MARGIN

(75) Inventors: Mohammed N. Islam, Allen, TX (US); Carl A. DeWilde, Richardson, TX (US)

(73) Assignee: Xtera Communications, Inc., Allen, TX (US)

( * ) Notice: Subject to any disclaimer, the term of this patent is extended or adjusted under 35 U.S.C. 154(b) by 775 days.

(21) Appl. No.: 10/100,591

(22) Filed: Mar. 15, 2002

(51) Int. Cl.
H04J 14/02 (2006.01)
H04B 10/00 (2006.01)

(52) U.S. Cl. .................... 398/82; 398/140; 398/160
(58) Field of Classification Search .................. 398/40, 398/79–88, 140–201
See application file for complete search history.

(56) References Cited

U.S. PATENT DOCUMENTS

| | | | |
|---|---|---|---|
| 3,772,528 A | 11/1973 | Anderson | 307/88.3 |
| 4,616,898 A | 10/1986 | Hicks, Jr. | 350/96.15 |
| 4,700,339 A | 10/1987 | Gordon et al. | 370/3 |
| 4,932,739 A | 6/1990 | Islam | 350/96.15 |
| 4,995,690 A | 2/1991 | Islam | 350/96.15 |
| 5,020,050 A | 5/1991 | Islam | 370/4 |
| 5,060,302 A | 10/1991 | Grimes | 359/135 |
| 5,078,464 A | 1/1992 | Islam | 385/122 |
| 5,101,456 A | 3/1992 | Islam | 385/27 |
| 5,115,488 A | 5/1992 | Islam et al. | 385/129 |
| 5,117,196 A | 5/1992 | Epworth et al. | 359/333 |
| 5,140,456 A | 8/1992 | Huber | 359/341 |
| 5,184,243 A | 2/1993 | Henmi et al. | 359/181 |
| 5,224,194 A | 6/1993 | Islam | 385/122 |
| 5,225,922 A | 7/1993 | Chraplyvy et al. | 359/124 |
| 5,343,322 A | 8/1994 | Pirio et al. | 359/173 |
| 5,369,519 A | 11/1994 | Islam | 359/173 |
| 5,485,536 A | 1/1996 | Islam | 385/31 |
| 5,557,442 A | 9/1996 | Huber | 359/179 |
| 5,559,920 A | 9/1996 | Chraplyvy et al. | 385/123 |
| 5,600,473 A | 2/1997 | Huber | 359/179 |

(Continued)

FOREIGN PATENT DOCUMENTS

EP 0 829 980 A2 3/1998

(Continued)

OTHER PUBLICATIONS

Vareille, G., B. Julien, F. Pitel, J.F. Marcerou. "3.65 Tbit/s (365×11.6 Gbit/s) transmission experiment over 6850 km using 22.2 GHz channel spacing in NRZ format." ECOC 2001. 27th Euro. Conf. on Opt. Comm. vol. 6, Sep. 30-Oct. 4, 2001. p. 14-15.*

(Continued)

Primary Examiner—Jason Chan
Assistant Examiner—David Lee
(74) Attorney, Agent, or Firm—Baker Botts L.L.P.

(57) ABSTRACT

An optical communication system is operable to communicate a plurality of wavelength signals at a bit rate of at least 9.5 gigabits per second over a multiple span communication link spanning at least 400 kilometers without optical regenerators. The plurality of wavelength signals include a bandwidth of more than 32 nanometers separated into at least 160 optical channels. The system includes a plurality of optical transmitters implementing a forward error correction (FEC) coding technique. The FEC encoded wavelength signals comprise a bit error rate of $10^{-09}$ or better after FEC decoding. The system also includes at least five (5) optical add/drop multiplexers (OADMs), each coupled to one or more spans of the multiple span communication link. The system further includes a plurality of amplifiers each coupled to one or more spans of the communication link, at least a majority of the amplifiers comprise a distributed Raman amplification stage.

61 Claims, 8 Drawing Sheets

U.S. PATENT DOCUMENTS

| | | | |
|---|---|---|---|
| 5,608,561 A | 3/1997 | Marcuse et al. | 359/161 |
| 5,623,508 A | 4/1997 | Grubb et al. | 372/3 |
| 5,629,795 A | 5/1997 | Suzuki et al. | 359/337 |
| 5,633,750 A | 5/1997 | Nogiwa et al. | 359/341 |
| 5,642,215 A | 6/1997 | Suzuki et al. | 359/161 |
| 5,664,036 A | 9/1997 | Islam | 385/31 |
| 5,673,280 A | 9/1997 | Grubb et al. | 372/3 |
| 5,710,650 A * | 1/1998 | Dugan | 398/91 |
| 5,778,014 A | 7/1998 | Islam | 372/6 |
| 5,784,184 A | 7/1998 | Alexander et al. | 359/125 |
| 5,790,289 A | 8/1998 | Taga et al. | 359/124 |
| 5,796,909 A | 8/1998 | Islam | 385/147 |
| 5,798,853 A | 8/1998 | Watanabe | 359/160 |
| 5,801,860 A | 9/1998 | Yoneyama | 359/124 |
| 5,815,518 A | 9/1998 | Reed et al. | 372/6 |
| 5,828,478 A | 10/1998 | Thomine et al. | 359/181 |
| 5,852,510 A | 12/1998 | Meli et al. | 359/341 |
| 5,872,647 A | 2/1999 | Taga et al. | 359/184 |
| 5,887,093 A | 3/1999 | Hansen et al. | 385/27 |
| 5,905,838 A | 5/1999 | Judy et al. | 385/123 |
| 5,920,423 A | 7/1999 | Grubb et al. | 359/341 |
| 5,953,138 A | 9/1999 | Ellis | 359/123 |
| 5,959,750 A | 9/1999 | Eskildsen et al. | 359/134 |
| 5,959,766 A | 9/1999 | Otterbach et al. | 359/337 |
| 5,978,130 A | 11/1999 | Fee et al. | 359/341 |
| 5,995,275 A | 11/1999 | Sugaya | 359/341 |
| 5,999,289 A | 12/1999 | Ihara et al. | 359/124 |
| 6,005,702 A | 12/1999 | Suzuki et al. | 359/183 |
| 6,008,933 A | 12/1999 | Grubb et al. | 359/341 |
| 6,040,933 A | 3/2000 | Khaleghi et al. | 359/124 |
| 6,043,927 A | 3/2000 | Islam | 359/332 |
| 6,049,413 A | 4/2000 | Taylor et al. | 359/337 |
| 6,052,393 A | 4/2000 | Islam | 372/6 |
| 6,055,092 A | 4/2000 | Sugaya et al. | 359/334 |
| 6,067,177 A | 5/2000 | Kanazawa | 359/124 |
| 6,067,180 A | 5/2000 | Roberts | 359/181 |
| 6,072,601 A | 6/2000 | Toyohara | 358/484 |
| 6,081,360 A | 6/2000 | Ishikawa et al. | 359/161 |
| 6,081,366 A | 6/2000 | Kidorf et al. | 359/341 |
| 6,084,694 A | 7/2000 | Milton et al. | 359/124 |
| 6,088,152 A | 7/2000 | Berger et al. | 359/334 |
| 6,094,296 A | 7/2000 | Kosaka | 359/341 |
| 6,097,524 A | 8/2000 | Doran et al. | 359/179 |
| 6,101,024 A | 8/2000 | Islam et al. | 359/334 |
| 6,104,848 A | 8/2000 | Toyohara et al. | 385/24 |
| 6,115,157 A | 9/2000 | Barnard et al. | 359/124 |
| 6,115,173 A | 9/2000 | Tanaka et al. | 359/333 |
| 6,115,174 A | 9/2000 | Grubb et al. | 359/334 |
| 6,134,034 A | 10/2000 | Terahara | 359/124 |
| 6,141,127 A | 10/2000 | Boivin et al. | 359/124 |
| 6,147,794 A | 11/2000 | Stentz | 359/334 |
| 6,151,160 A | 11/2000 | Ma et al. | 359/341 |
| 6,163,394 A | 12/2000 | Webb | 359/181 |
| 6,163,636 A | 12/2000 | Stentz et al. | 385/24 |
| 6,172,803 B1 | 1/2001 | Masuda et al. | 359/341 |
| 6,181,449 B1 | 1/2001 | Taga et al. | 359/124 |
| 6,181,464 B1 | 1/2001 | Kidorf et al. | 359/334 |
| 6,185,022 B1 | 2/2001 | Harasawa | 359/124 |
| 6,191,854 B1 | 2/2001 | Grasso et al. | 356/341 |
| 6,204,949 B1 | 3/2001 | Ishikawa et al. | 359/161 |
| 6,219,162 B1 | 4/2001 | Barnard et al. | 359/124 |
| 6,219,176 B1 | 4/2001 | Terahara | 359/341 |
| 6,229,937 B1 | 5/2001 | Nolan et al. | 385/24 |
| 6,236,488 B1 | 5/2001 | Shimizu et al. | 359/187 |
| 6,236,498 B1 * | 5/2001 | Freeman et al. | 359/337.1 |
| 6,239,902 B1 | 5/2001 | Islam et al. | 359/334 |
| 6,239,903 B1 | 5/2001 | Islam et al. | 359/337 |
| 6,246,498 B1 | 6/2001 | Dishman et al. | 359/123 |
| 6,252,692 B1 | 6/2001 | Roberts | 359/173 |
| 6,252,700 B1 | 6/2001 | Hwang et al. | 359/337 |
| 6,263,139 B1 | 7/2001 | Kawakami et al. | 385/123 |
| 6,271,945 B1 | 8/2001 | Terahara | 359/124 |
| 6,282,002 B1 | 8/2001 | Grubb et al. | 359/160 |
| 6,297,895 B1 | 10/2001 | Okuno | 359/124 |
| 6,310,716 B1 * | 10/2001 | Evans et al. | 359/334 |
| 6,317,239 B1 | 11/2001 | Burbidge et al. | 359/161 |
| 6,320,884 B1 | 11/2001 | Kerfoot, III et al. | 372/3 |
| 6,335,820 B1 | 1/2002 | Islam | 359/334 |
| 6,341,034 B1 | 1/2002 | Sun et al. | 359/341.41 |
| 6,344,922 B1 | 2/2002 | Grubb et al. | 359/334 |
| 6,356,383 B1 | 3/2002 | Cornwell, Jr. et al. | 359/334 |
| 6,356,384 B1 | 3/2002 | Islam | 359/334 |
| 6,359,725 B1 | 3/2002 | Islam | 359/334 |
| 6,370,164 B1 | 4/2002 | Islam | 372/6 |
| 6,374,006 B1 | 4/2002 | Islam et al. | 385/15 |
| 6,381,391 B1 | 4/2002 | Islam et al. | 385/123 |
| 6,388,801 B1 | 5/2002 | Sugaya et al. | 359/334 |
| 6,404,523 B1 | 6/2002 | Morikawa et al. | 359/124 |
| 6,404,964 B1 | 6/2002 | Bhagavatula et al. | 385/123 |
| 6,414,786 B1 | 7/2002 | Foursa | 359/334 |
| 6,417,959 B1 | 7/2002 | Bolshtyansky et al. | 359/334 |
| 6,437,906 B1 | 8/2002 | Di Pasquale et al. | 359/337.2 |
| 6,456,426 B1 * | 9/2002 | Bolshtyansky et al. | 359/334 |
| 6,587,237 B1 * | 7/2003 | Shi et al. | 385/24 |
| 6,728,486 B1 * | 4/2004 | Hutchison et al. | 398/83 |
| 6,873,455 B2 * | 3/2005 | Sugaya et al. | 359/334 |
| 6,904,438 B2 * | 6/2005 | Harris et al. | 707/102 |
| 2001/0014194 A1 | 8/2001 | Sasaoka et al. | 385/15 |
| 2001/0050802 A1 | 12/2001 | Namiki et al. | 359/337.11 |
| 2002/0001123 A1 | 1/2002 | Miyakawa et al. | 359/334 |
| 2002/0048062 A1 | 4/2002 | Sakamoto et al. | 359/124 |
| 2002/0060821 A1 | 5/2002 | Manna et al. | 359/124 |

FOREIGN PATENT DOCUMENTS

| | | |
|---|---|---|
| EP | 0 903 877 A2 | 3/1999 |
| EP | 0 911 926 A1 | 4/1999 |
| EP | 0 959 578 A2 | 11/1999 |
| EP | 1 009 120 A2 | 6/2000 |
| EP | 1 054 489 A2 | 11/2000 |
| EP | 1 061 683 A1 | 12/2000 |
| EP | 1 069 712 A2 | 1/2001 |
| EP | 1 180 860 A1 | 2/2001 |
| WO | 98/36479 | 8/1998 |
| WO | 98/42088 | 9/1998 |
| WO | 99/43117 | 8/1999 |
| WO | 99/66607 | 12/1999 |
| WO | 00/49721 | 8/2000 |
| WO | 00/72479 | 11/2000 |
| WO | 00/73826 A2 | 12/2000 |

OTHER PUBLICATIONS

Ramaswami, Rajiv. Kumar N. Sivarajan. "Optical Network: A Practical Perspective" 1st edition. Morgan Kaufmann Publishers, Inc. 1998. pp. 465-466.*

Vareille, G., B. Julien, F. Pitel, J.F. Marcerou. "3.65 Tbit/s (365×11.6 Gbit/s) transmission experiment over 6850 km using 22.2 GHz channel spacing in NRZ format." ECOC 2001. 27th Euro. Conf. on Opt. Comm. vol. 6, Sep. 30-Oct. 4, 2001. p. 14-15.*

Ramaswami, Rajiv. Kumar N. Sivarajan. "Optical Network: A Practical Perspective" 1st edition. Morgan Kaufmann Publishers, Inc. 1998. pp. 465-466.*

Knudsen, S.N., D.W. Peckham, M. Pedersen, B. Zhu, A.F. Judy, L.E. Nelson. "New dispersion-slope managed fiber pairs for ultra long haul transmission systems." National Fiber Optic Engineers Conference. p. 1599. 2001 Technical Proceedings.*

Vareille, G., B. Julien, F. Pitel, J.F. Marcerou. "3.65 Tbit/s (365×11.6 Gbit/s) transmission experiment over 6850 km using 22.2 GHz channel spacing in NRZ format." ECOC 2001. 27th Euro. Conf. on Opt. Comm. vol. 6, Sep. 30-Oct. 4, 2001. p. 14-15.*

Ramaswami, Rajiv, Kumar N. Sivarajan. "Optical Network: A Practical Perspective" 1st edition. Morgan Kaufmann Publishers, Inc. 1998. pp. 465-466.*

Mollenauer et al., "Soliton Propagation in Long Fibers with Periodically Compensated Loss," IEEE Journal of Quantum Electronics, vol. QE-22, No. 1, pp. 157-173, Jan. 1986.

Spirit et al., "Systems aspects of Raman fibre amplifiers," Optical Amplifiers for Communication, IEE Proceedings, vol. 137, Pt. J, No. 4 pp. 221-224, Aug. 1990.

Chraplyvy et al., "Equalization in Amplified WDM Lightwave Transmission Systems," IEEE Photonics Technology Letters, vol. 4, No. 8, pp. 920-922, Aug. 1992.

Sekine et al., "10Gbit/s four-channel WDM transmission experiment over 500km with technique for suppressing four-wave mixing," Electronics Letters, vol. 30, No. 14, pp. 1150-1151, Jul. 7, 1994.

Hansen et al., "529 km unrepeatered transmission at 2.488 GBit/s using dispersion compensation, forward error correction, and remote post- and pre-amplifiers pumped by diode-pumped Raman lasers," IEE Electronics Letters Online No. 19951043, Jul. 7, 1995.

Hansen et al., "10 Gb/s, 411 km repeaterless transmission experiment employing dispersion compensation and remote post- and pre-amplifiers," 21st European Conference on Optical Communication, vol. 2, 1 page, Sep. 17-21, 1995.

Liaw et al., "Passive Gain-Equalized Wide-Band Erbium-Doped Fiber Amplifier Using Samarium-Doped Fiber," IEEE Photonics Technology Letters, vol. 8, No. 7, pp. 879-881, Jul. 1996.

Baney et al., "WDM EDFA Gain Characterization with a Reduced Set of Saturating Channels," IEEE Photonics Technology Letters, vol. 8, No. 12, pp. 1615-1617, Dec. 1996.

Goel et al., "Wide-Band Dispersion Compensating Optical Fiber," IEEE Photonics Technology Letters, vol. 8, No. 12, pp. 1668-1670, Dec. 1996.

White et al., "Optical Fiber Components and Devices," Optical Fiber Telecommunications,.Ch. 7, pp. 267-319, 1997.

Agrawal, "Fiber-Optic Communication Systems," Second Edition, Basic Concepts, John Wiley & Sons, Inc., pp. 365-366 plus title page and copyright page, 1997.

Masuda et al., "Ultra-wideband optical amplification with 3dB bandwidth of 65 nm using a gain-equalised two-stage erbium-doped fibre amplifier and Raman amplification," Electronics Letters Online No. 19970515, vol. 33, No. 9, Feb. 24, 1997.

Masuda et al., "Ultrawide 75-nm 3-dB Gain-Band Optical Amplication with Erbium-Doped Fluoride Fiber Amplifiers and Distributed Raman Amplifiers," IEEE Photonics Technology Letters, vol. 10, No. 4, pp. 516-518, Apr. 1998.

Tonguz et al., "Gain Equalization of EDFA Cascades," Journal of Lightwave Technology, vol. 15, No. 10, pp. 1832-1841, Oct. 1997.

Rottwitt et al., "Distributed Raman Amplifiers for Long Haul Transmission Systems," IEEE, pp. 251-252, 1998.

Kawai et al., "Ultrawide, 75-nm 3-dB gain-band optical amplifier utilizing erbium-doped fluoride fiber and Raman fiber," OFC Technical Digest, TuG3, pp. 32-33, 1998.

Hansen et al., "Loss compensation in dispersion compensating fiber modules by Raman amplification," OFC Technical Digest TuD1, pp. 20-21, 1998.

Dianov et al., "Highly efficient 1.3μm Raman fiber amplifier," Electronics Letters, vol. 34, No. 7, Apr. 2, 1998.

Ma et al., "240-km Repeater Spacing in a 5280-km WDM System Experiment Using 8×2.5 Gb/s NRZ Transmission," IEEE Photonics Technology Letters, vol. 10, No. 6, pp. 893-895, Jun. 1998.

Forghieri et al., "Simple Model of Optical Amplifier Chains to Evaluate Penalties in WDM Systems," Journal of Lightwave Technology, vol. 16, No. 9, pp. 1570-1576, Sep. 1998.

Chernikov et al., "Broadband Silica Fibre Raman Amplifiers at 1.3 μm and 1.5 μm," ECOC, pp. 49-50, Sep. 20-24, 1998.

Letellier et al., "Access to Transmission Performance Margins Through Pre-Emphasis Adjustment in WDM Systems," ECOC, pp. 275-276, Sep. 20-24, 1998.

Becker et al., "Erbium-Doped Fiber Amplifiers Fundamentals and Technology," Academic Press, pp. 55-60 plus title and copyright page, 1999.

Chernikov et al., "Broadband Raman amplifiers in the spectral range of 1480-1620 nm," OFC/IOOC Technical Digest, vol. 2, pp. 117-119, Feb. 21-26, 1999.

Masuda et al., "Wide-Band and Gain-Flattened Hybrid Fiber Amplifier Consisting of an EDFA and a Multiwavelength Pumped Raman Amplifier," IEEE Photonics Technology Letters, vol. 11, No. 6, pp. 647-649, Jun. 1999.

Kawai et al., "Wide-Bandwidth and Long-Distance WDM Transmission Using Highly Gain-Flattened Hybrid Amplifier," IEEE Photonics Technology Letters, vol. 11, No. 7, pp. 886-888, Jul. 1999.

Lewis et al., "Gain and saturation characteristics of dual-wavelength-pumped silica-fibre Raman amplifiers," Electronics Letters, vol. 35, No. 14, pp. 1178-1179, Jul. 8, 1999.

Suzuki et al., "50 GHz spaced, 32×10 Gbit/s dense WDM transmission in zero-dispersion region over 640km of dispersion-shifted fibre with multiwavelength distributed Raman amplification," Electronics Letters, vol. 35, No. 14, pp. 1175-1176, Jul. 8, 1999.

Emori et al., "100nm bandwidth flat-gain Raman amplifiers pumped and gain-equalised by 12-wavelength-channel WDM laser diode unit," Electronics Letters, vol. 35, No. 16, pp. 1355-1356, Aug. 5, 1991.

Yun et al., "Dynamic Erbium-Doped Fiber Amplifier Based on Active Gain Flattening with Fiber Acoustooptic Tunable Filters," IEEE Photonics Technology Letters, vol. 11, No. 10, pp. 1229-1231, Oct. 1999.

Otte et al., Performance of Electronic Compensator for Chromatic Dispersion & SPM, ECOC 3.2.4, 2 pages, 2000.

Bülow et al., "Electronically Enhanced Optical PMD Compensation," ECOC 4.2.4, 2 pages, 2000.

Mikkelsen et al., "160 Gb/s TDM Transmission Systems," ECOC, 4 pages, 2000.

Keslassy et al., "Maintaining Packet Order in Two-stage Switches," Computer Systems Laboratory, Stanford University, 10 pages.

Manna et al., "Modeling of Penalties on Chains of Optical Amplifiers with Equalizing Filters," Journal of Lightwave Technology, vol. 18, No. 3, pp. 295-300, Mar. 2000.

Witte et al., "Reducing the optical power penalty for electronically dispersion compensated LED pulse transmission by using multi-bit shift decision feedback," Electronics Letters, vol. 36, No. 5, 2 pages, Mar. 2, 2000.

Nielsen et al., "3.28 Tb/s (82/spl times 40 Gb/s) transmission over 3/spl times 100 km nonzero-dispersion fiber using dual C- and L-band hybrid Raman/erbium doped inline amplifiers," OFCC 2000, vol. 4, pp. 236-238 plus internet title page, Mar. 7-10, 2000.

Cariali et al., "Electronic compensation of PMD and chromatic dispersion with an IC in 10 Gbit/s transmission system," Electronics Letters, vol. 36, No. 10, 2 pages, May 11, 2000.

Cravotta, "DWDM: feeding our insatiable appetite for bandwidth (Technology Information)," Findarticles.com, http://www.findarticles.com, 8 pages, Sep. 1, 2000.

Sano et al., "20 Gbit/s chirped return-to-zero transmitter with simplified configuration using electro-absorption modulator," Electronics Letters, vol. 36, No. 22, 2 pages, Oct. 26, 2000.

Fludger et al., "Fundamental Noise Limits in Broadband Raman Amplifiers," OFC, paper, MA5-1-MA5-3, 2001.

Seo et al., "Compensation of Raman-Induced Crosstalk Using a Lumped Germanosilicate Fiber Raman Amplifier in the 1.571-1.591-μm Region," IEEE Photonics Technology Letters, vol. 13, No. 1, pp. 28-30, Jan. 2001.

Seo et al., "Simultaneous Amplification and Channel Equalization Using Raman Amplifier for 30 Channels in 1.3-μm Band," Journal of Lightwave Technology, vol. 19, No. 3, pp. 391-397, Mar. 2001.

Chen et al., "Transient effects in saturated Raman amplifiers," Electronics Letters, vol. 37, No. 6, 2 pgs, Mar. 15, 2001.

Tomkos et al., "Demonstration of Negative Dispersion Fibers for DWDM Metropolitan Area Networks," IEEE Journal on Selected Topics in Quantum Electronics, vol. 7, No. 3, pp. 439-460, May 2001.

Mollenauer, "Raman amplification and dispersion-managed solitions for all-optical, ultra-long-haul, dense WDM," Optical Society of America, Optical Amplifers and Their Applications, Technical Digest, Jul. 1-4, 2001.

Menif et al., "Application of Preemphasis to Achieve Flat Output OSNR in Time-Varying Channels in Cascaded EDFAs Without Equalization," Journal of Lightwave Technology, vol. 19, No. 10, pp. 1440-1452, Oct. 2001.

Murakami et al., "WDM Upgrading of an Installed Submarine Optical Amplifier System," Journal of Lightwave Technology, vol. 19, No. 11, pp. 1665-1674, Nov. 2001.

Woodfin et al. "Negative-dispersion fiber in metropolitan networks," Lightwave, 8 pages, Jan. 2002.

"Forward Error Correction in Optical Transmission, Reed Solomon and Turbo Product Codes compared," 2 pages.

Scheerer et al., "SRS crosstalk in preemphasized WDM Systems," paper, WM28-1/293-WM28-3/295.

Yariv, "Optical Electronics in Modern Communications," Detection of Optical Radiation, Ch. 11, pp. 412-473.

Nissov et al., "100 Gb/s (10×10Gb/s) WDM Transmission Over 7200 km Using Distributed Raman Amplification," pp. 9-12.

Masuda et al., "76-nm 3-dB gain-band hybrid fiber amplifier without gain-equalizer," (Submitted to Post-Deadline Paper OAA '98), paper PD7-1-PD7-5.

Rottwitt et al., "A 92 nm Bandwidth Raman Amplifier," paper PD6-1-PD6-4.

Tashiro et al., "1.5 W Erbium Doped Fiber Amplifier Pumped by the Wavelength Division-Multiplexed 1480 nm Laser Diodes with Fiber Bragg Grating," Optical Transmission Systems Group, paper, WC2-1-WC2-2, pp. 213-214.

Walker, "Status and challenges of optical fiber amplifiers and lasers," paper, MB-1-MB1-3, pp. 12-14.

Srivastava et al., "High-speed WDM Transmission in AllWave™ Fiber in Both the 1.4-μm and 1.55-μm Bands," paper PD2-2-PD2-5.

Emori et al., "Less than 4.7 dB Noise Figure Broadband In-line EDFA with A Raman Amplified-1300 ps/nm DCF Pumped by Multi-channel WDM Laser Diodes," paper PD3-1-PD3-5.

Koch et al., "Broadband gain flattened Raman Amplifier to extend operation in the third telecommunication window," paper, FF3-1/103-FF3-3/105.

Emori et al., "Cost-effective depolarized diode pump unit designed for C-band flat-gain Raman amplifiers to control EDFA gain profile," paper, FF4-1/106—FF4-3/108.

Pending Patent Application; WO 99/66607; entitled "Dispersion Compensating and Amplifying Optical Element, Method for Minimizing Gain Tilt, and Apparatus for Minimizing Non-Linear Interaction between Band Pumps," by Mohammed N. Islam et al., filed Jun. 16, 1999.

Pending U.S. Appl. No. 09/766,489; entitled "Nonlinear Polarization Amplifiers in Nonzero Dispersion Shifted Fiber," by Mohammed N. Islam, filed Jan. 19, 2001.

Pending U.S. Appl. No. 09/765,972; entitled "S+ Band Nonlinear Polarization Amplifiers," by Mohammed N. Islam, filed Jan. 19, 2001.

Pending U.S. Appl. No. 09/768,367, entitled "All Band Amplifier," by Mohammed N. Islam, filed Jan. 22, 2001.

Pending U.S. Appl. No. 09/800,085; entitled "Dispersion Compensating Nonlinear Polarization Amplifiers," by Mohammed N. Islam, filed Mar. 5, 2001.

Pending U.S. Appl. No. 09/811,067, entitled "Method and System for Reducing Degradation of Optical Signal to Noise Ratio," by Michel W. Chbat et al., filed Mar. 16, 2001.

Pending U.S. Appl. No. 09/811,103; entitled "System and Method for Wide Band Raman Amplification," by Mohammed N. Islam et al., filed Mar. 16, 2001.

Pending U.S. Appl. No. 09/916,454; entitled "System and Method for Controlling Noise Figure," by Mohammed N. Islam et al., filed Jul. 27, 2001.

Pending U.S. Appl. No. 10/003,199; entitled "Broadband Amplifier and Communication System," by Mohammed N. Islam, Oct. 30, 2001.

Pending U.S. Appl. No. 10/007,643; entitled "Multi-Stage Optical Amplifier and Broadband Communication System," by Mohammed Islam, filed Nov. 6, 2001.

Pending U.S. Appl. No. 10/005,472; entitled "Multi-Stage Optical Amplifier and Broadband Communication System," by Mohammed Islam, filed Nov. 6, 2001.

Pending U.S. Appl. No. 09/990,142; entitled "Broadband Amplifier and Communication System," by Mohammed N. Islam, filed Nov. 20, 2001.

Pending U.S. Appl. No. 10/014,839; entitled "Multi-Stage Optical Amplifier and Broadband Communication System," by Mohammed N. Islam, filed Dec. 10, 2001.

Pending U.S. Appl. No. 10/100,589; entitled "System and Method for Dispersion Compensation in an Optical Communication System," by Mohammed N. Islam et al., filed Mar. 15, 2002.

Pending U.S. Appl. No. 10/100,615; entitled "Band Optical Add/Drop Multiplexing" by Mohammed N. Islam et al., filed Mar. 15, 2002.

Pending U.S. Appl. No. 10/100,587; entitled "Fiber Optic Transmission System with Low Cost Transmitter Compensation," by Mohammed N. Islam, filed Mar. 15, 2002.

Pending U.S. Appl. No. 10/100,700; entitled "Rack System for an End Terminal in an Optical Communication Network," by Mohammed N. Islam et al., filed Mar. 15, 2002.

Pending U.S. Appl. No. 10/116,487; entitled "Fiber Optic Transmission System for a Metropolitan Area Network," by Mohammed N. Islam, filed Apr. 3, 2002.

Pending U.S. Appl. No. 10/211,209; entitled "Active Gain Equalization," by Mohammed N. Islam et al., filed Aug. 2, 2002.

Hiroji Masuda and Shingo Kawal, Ultra Wide-Band Raman Amplification With A Total Gain-Bandwidth of 132 nm Of Two Gain-Bands Around 1.5 μm, ECOC '99, Nice, France, pp. II-146-II-147, Sep. 26-30, 1999.

Sugizaki, et al., Slope Compensating DCF for S-band Raman Amplifier, OSA TOPS vol. 60, Optical Amplifiers and Their Applications, Nigel Jolley, John D. Minelly, and Yoshiaki Nakano, eds., 2001 Optical Society of America, pp. 49-53, 2001.

Vasilyev, et al., Pump intensity noise and ASE spectrum of Raman amplification in non-zero dispersion-shifted fibers, reprinted from the Optical Amplifiers and Their Applications Conference, 2001 Technical Digest, 2001 Optical Society of America, pp. 57-59, 2001.

* cited by examiner

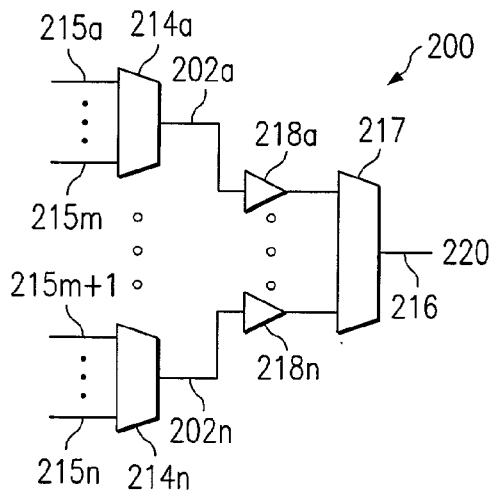
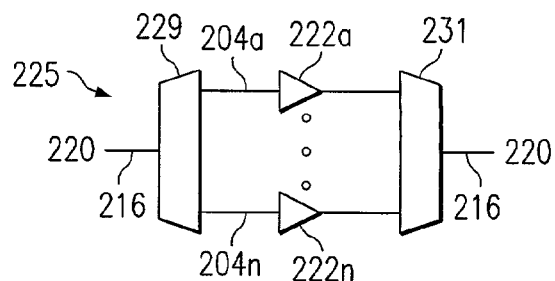
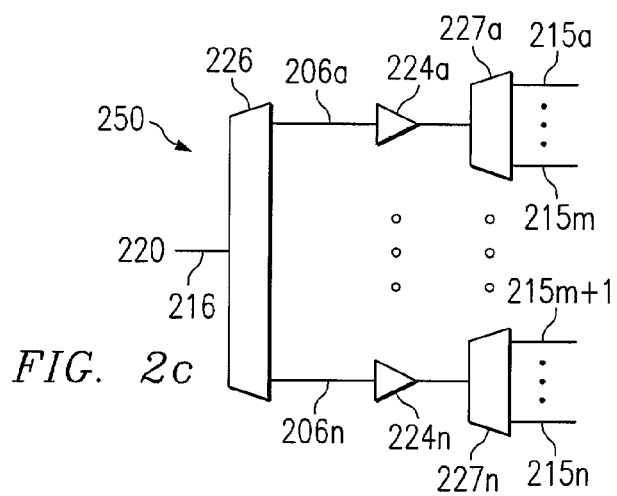
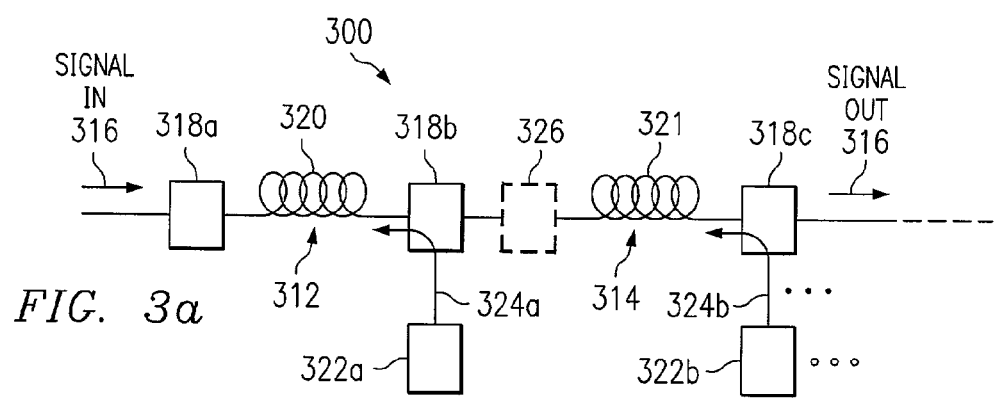
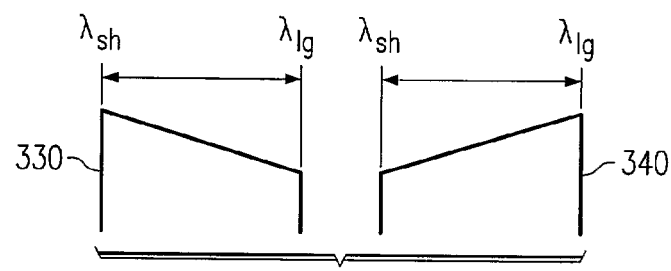

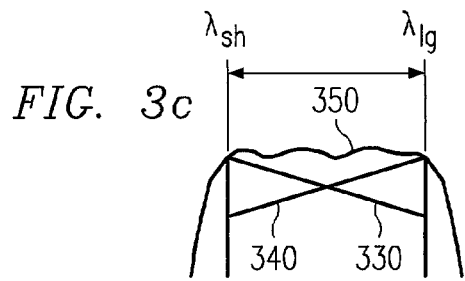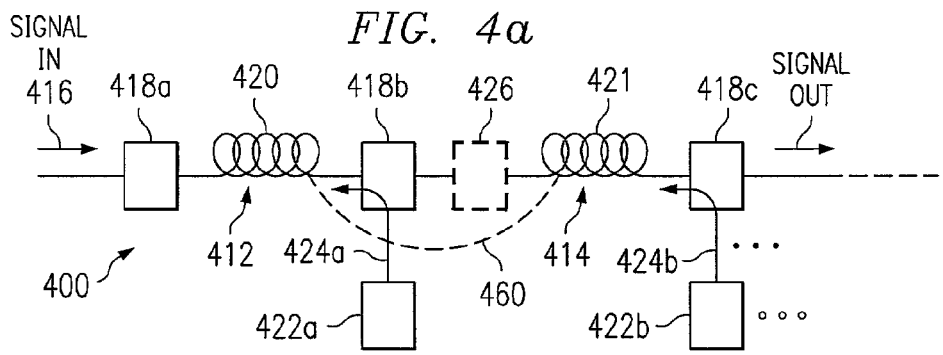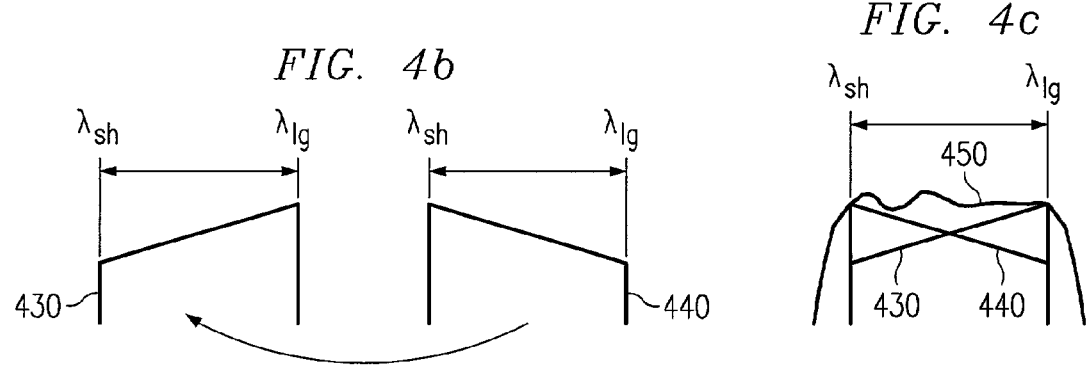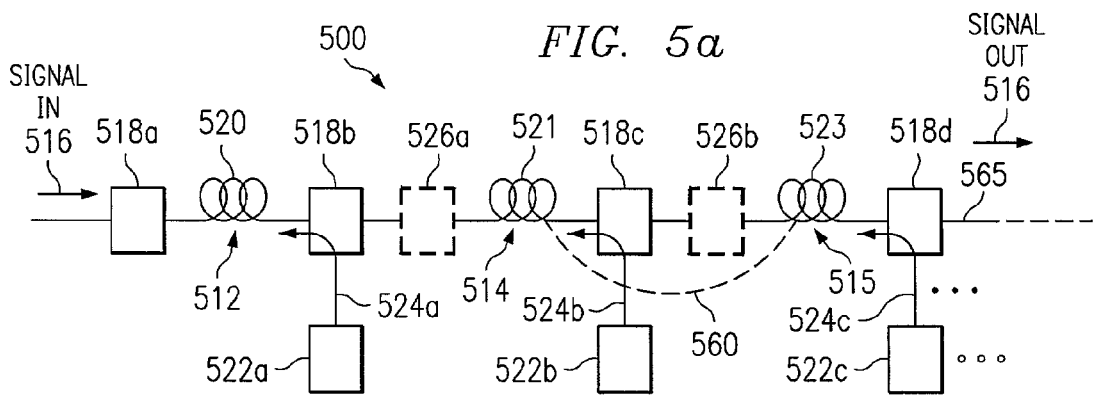

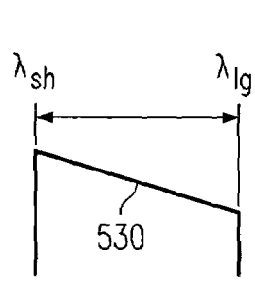
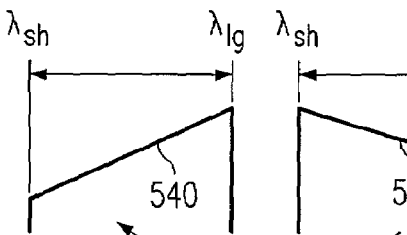
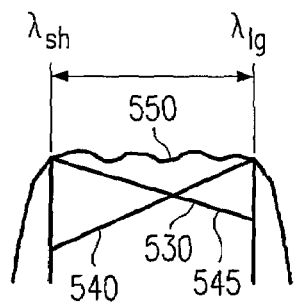
FIG. 5b
FIG. 5c
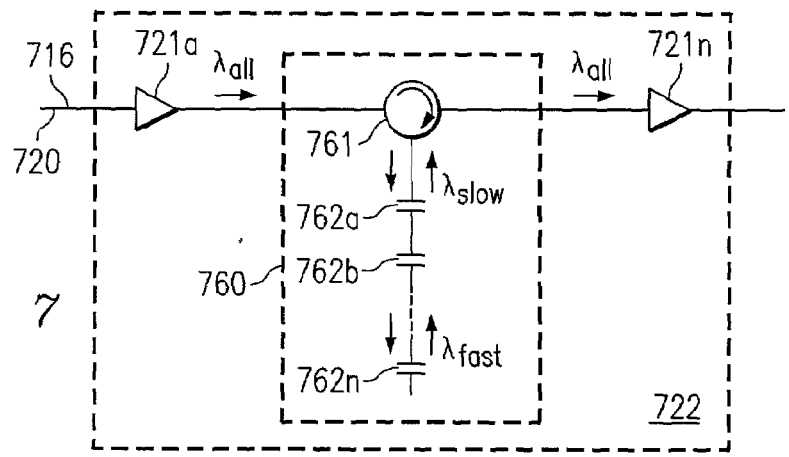
FIG. 7
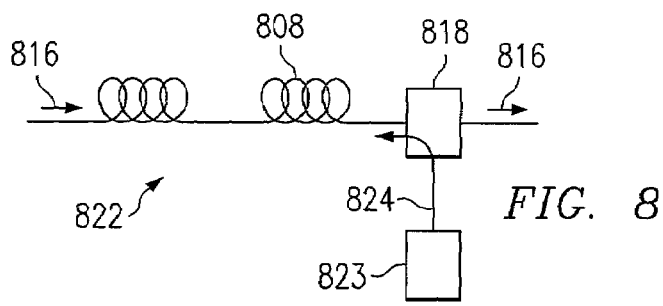
FIG. 8
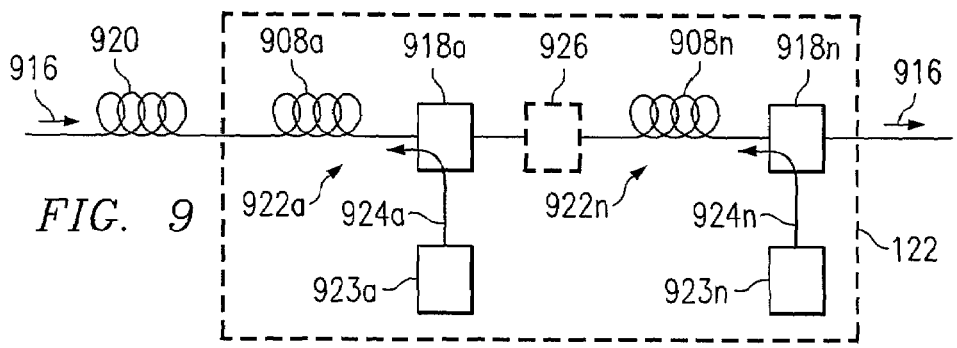
FIG. 9

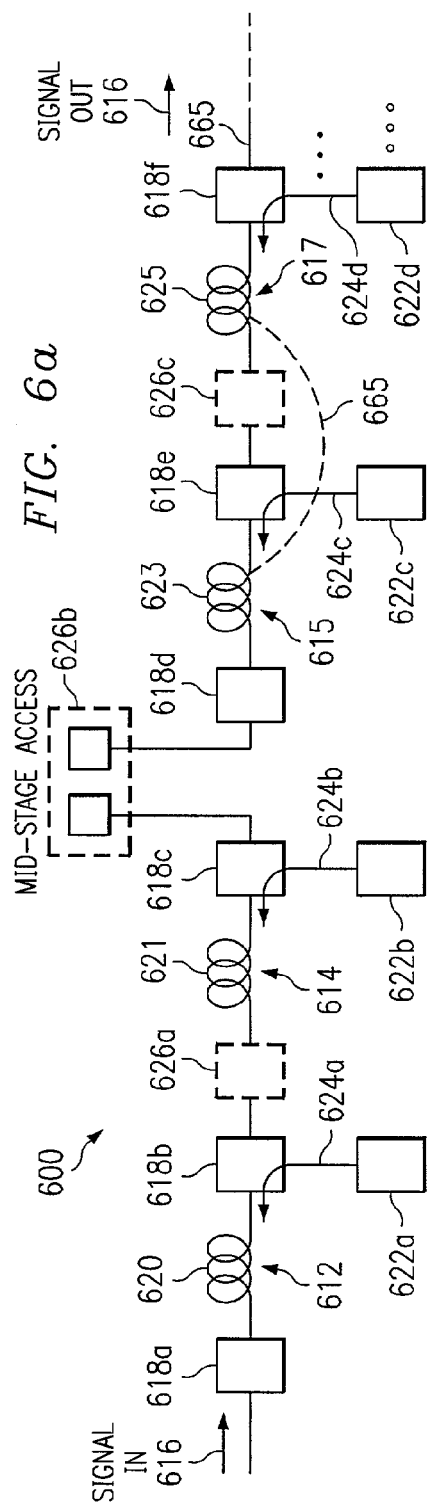
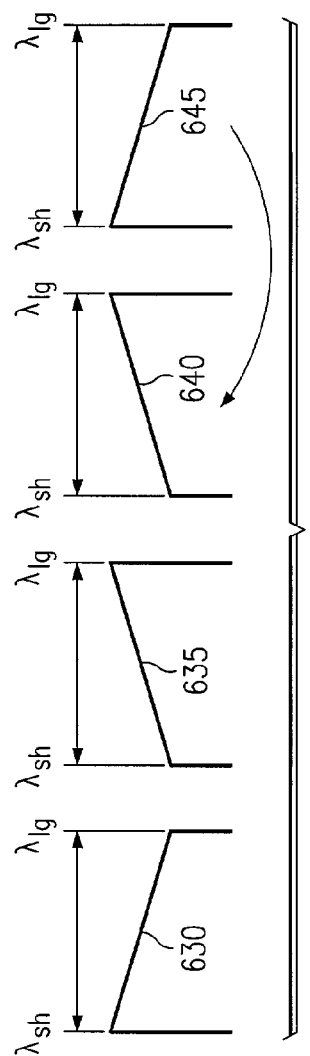
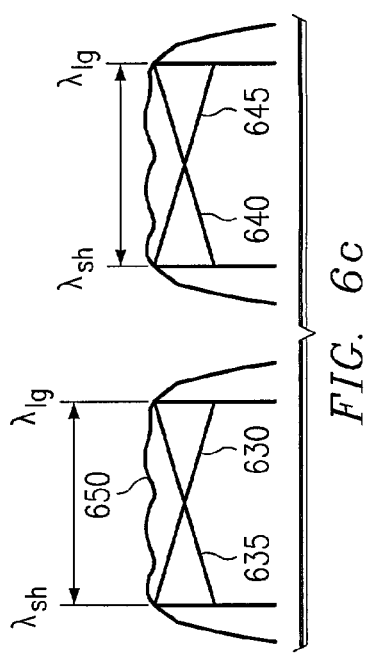
FIG. 6a
FIG. 6b
FIG. 6c

PULSE SPECTRA ———
FILTER LOSS - - - - -

SYSTEM AND METHOD FOR MANAGING SYSTEM MARGIN

TECHNICAL FIELD OF THE INVENTION

The present invention relates generally to communication systems and, more specifically, to a system and method for managing system margin in an optical communication system.

OVERVIEW

In designing an optical communication system there is often a tension between reducing system cost and maintaining acceptable system performance. For example, lower cost components are often less capable of maintaining a given system loss budget than their more expensive counterparts. As a result, conventional optical communication systems typically have insufficient system margin to achieve low cost system design while maintaining relatively high performance.

SUMMARY OF EXAMPLE EMBODIMENTS

The present invention provides an improved system and apparatus for the communication of optical signals. In accordance with the present invention, a system and method for managing system margin are provided that reduce or eliminate at least some of the shortcomings associated with prior approaches.

In one embodiment, an optical communication system comprises a plurality of optical transmitters operable to generate alone or collectively a plurality of wavelength signals at a bit rate of at least 9.5 gigabits per second. The plurality of optical transmitters are also operable to communicate the plurality of wavelength signals over a multiple span communication link spanning at least 400 kilometers without optical regenerators. The plurality of wavelength signals comprise a bandwidth of more than 32 nanometers separated into at least 160 optical channels. At least a majority of the transmitters implement a forward error correction (FEC) coding technique and communicate to the communication link FEC encoded wavelength signals. The FEC encoded wavelength signals comprise a bit error rate of $10^{-09}$ or better after FEC decoding at a receiver coupled to the communication link. The system also comprises at least five (5) optical add/drop multiplexers (OADMs), each coupled to one or more spans of the multiple span communication link. The system further comprises a plurality of amplifiers each coupled to one or more spans of the communication link, at least a majority of the amplifiers comprising a distributed Raman amplification stage.

In one particular embodiment, each of at least a majority of the plurality of amplifiers comprises a single amplifier operable to amplify all of the plurality of wavelength signals. In another embodiment, each OADM imparts no more than two decibels of loss to any of the plurality of wavelength signals. In yet another embodiment, at least a majority of the amplifiers comprising a Raman amplification stage include a gain medium comprising a length of dispersion compensating fiber In still another embodiment, an optical communication system comprises a plurality of optical transmitters operable to generate alone or collectively a plurality of wavelength signals at a bit rate of at least 9.5 gigabits per second. The plurality of optical transmitters are also operable to communicate the plurality of wavelength signals over a multiple span communication link spanning at least 400 kilometers without optical regenerators. The plurality of wavelength signals comprise a bandwidth of more than 32 nanometers separated into at least 160 optical channels. At least a majority of the transmitters implement a forward error correction (FEC) coding technique and communicate to the communication link FEC encoded wavelength signals. The FEC encoded wavelength signals comprise a bit error rate of $10^{-09}$ or better after FEC decoding at a receiver coupled to the communication link. The system also comprises at least five (5) optical add/drop multiplexers (OADMs), each coupled to one or more spans of the multiple span communication link. Each OADM imparts no more than two decibels of loss to any of the plurality of wavelength signals. The system further comprises a plurality of amplifiers each coupled to one or more spans of the communication link. At least a majority of the amplifiers comprising a Raman amplification stage include a gain medium comprising a length of dispersion compensating fiber. In one particular embodiment, at least a majority of the plurality of amplifiers comprise a single amplifier operable to amplify all of the plurality of wavelength signals.

In a method embodiment, a method of communicating optical signals comprises generating a plurality of wavelength signals at a rate of at least 9.5 gigabits per second. The plurality of wavelength signals comprise a bandwidth of at least 32 nanometers separated into at least 160 optical channels. The method also comprises encoding a forward error correction (FEC) sequence onto at least a majority of plurality of wavelength signals. The FEC encoded wavelength signals comprise a bit error rate of $10^{-09}$ or better after FEC decoding. The method further comprises communicating the plurality of wavelength signals to a multiple span communication link spanning at least 400 kilometers without optical regenerators. The method also comprises adding/dropping one or more of the plurality of wavelength signals at at least five OADMs coupled to multiple span communications link. The method further comprises amplifying the plurality of wavelength signals at a plurality of amplification sites. At least a majority of the amplification sites comprise a distributed Raman amplification stage.

In one particular embodiment, each of at least a majority of the plurality of amplifiers comprises a single amplifier operable to amplify all of the plurality of wavelength signals. In other embodiment, each time the at least one wavelength signal is added/dropped, a loss of no more than two decibels is imparted to any of the plurality of wavelength signals. In yet another embodiment, at least a majority of the amplification sites comprise a distributed Raman amplification stage including a gain medium comprising a length of dispersion compensating fiber.

Depending on the specific features implemented, particular embodiments of the present invention may exhibit some, none, or all of the following technical advantages. Various embodiments facilitate managing a system loss budget to ensure that a relatively wide bandwidth of signals separated into a relatively large number of channels can be communicated distances of more than 400 kilometers without optical regeneration while maintaining a bit error rate of $10^{-09}$ or better.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which:

FIGS. 2a through 2c are block diagrams showing example embodiments of amplification assemblies implementing parallel combinations of amplifiers;

FIGS. 3a through 3c illustrate an example embodiment of a multiple stage amplifier with a plurality of gain profiles that yield a substantially flat overall gain profile for the amplifier;

FIGS. 4a through 4c illustrate an example of a high pump efficiency embodiment of a multiple stage wide band amplifier with a plurality of gain profiles that yield a substantially flat overall gain profile for the amplifier;

FIGS. 5a through 5c illustrate a three-stage amplifier, gain profiles associated with various stages of the amplifier, and a composite gain of the amplifier;

FIGS. 6a through 6c illustrate a four-stage amplifier, gain profiles associated with various stages of the amplifier, and a composite gain of the amplifier;

FIG. 7 is a block diagram of one example of a dispersion compensation technique implementing at least one chirped Bragg grating;

FIG. 8 is a block diagram of one example of a dispersion compensation technique implementing dispersion compensating fiber as at least a portion of a gain medium within a Raman amplification stage;

FIG. 9 is a block diagram of one example of a dispersion compensation technique implementing dispersion compensating fiber within a multiple stage amplifier;

DETAILED DESCRIPTION OF EXAMPLE EMBODIMENTS

Figure 1:
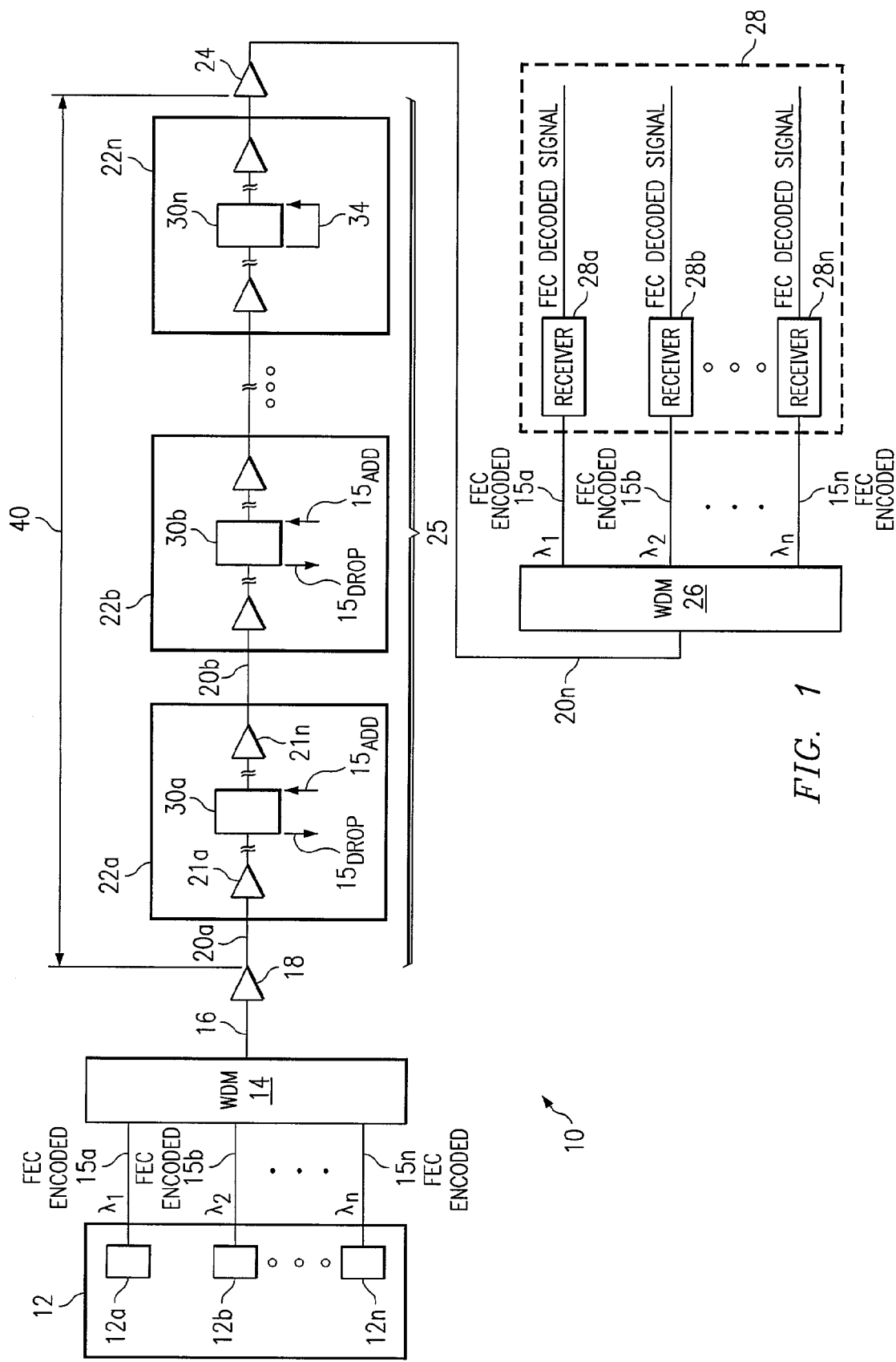
FIG. 1 is a block diagram showing at least a portion of an exemplary optical communication system operable to facilitate communication of one or more multiple wavelength signals.

FIG. 1 is a block diagram showing at least a portion of an exemplary optical communication system 10 operable to facilitate communication of one or more multiple wavelength signals 16. Each multiple wavelength signal 16 comprises a plurality of optical wavelength signals (or channels) 15a–15n, each comprising a center wavelength of light. In some embodiments, each optical signal 15a–15n can comprise a center wavelength that is substantially different from the center wavelengths of other signals 15. As used throughout this document, the term "center wavelength" refers to a time-averaged mean of the spectral distribution of an optical signal. The spectrum surrounding the center wavelength need not be symmetric about the center wavelength. Moreover, there is no requirement that the center wavelength represent a carrier wavelength.

In the illustrated example, wavelength signals 15a–15n comprise a bandwidth of wavelengths of at least thirty-two (32) nanometers. In some embodiments, wavelength signals 15a–15n can comprise a bandwidth of more than sixty (60) nanometers, or even more than eighty (80) or one hundred (100) nanometers. In this example, wavelength signals 15a–15n comprise at least one hundred sixty (160) channels. In some embodiments, wavelength signals 15a–15n can comprise more than two hundred (200) or even more than two hundred-forty (240) channels.

In this example, system 10 includes a transmitter assembly 12 operable to generate the plurality of optical signals (or channels) 15a–15n. Transmitter assembly 12 may, in some cases, comprise a portion of an optical regenerator. That is, transmitter assembly 12 may generate optical signals 15 based on electrical representations of optical signals received from other optical communication links. In other cases, transmitter assembly 12 may generate optical signals 15 based on information received from sources residing locally to transmitters 12.

In one embodiment, transmitter assembly 12 comprises a plurality of independent pairs of optical sources and associated modulators, each pair being operable to generate one or more wavelength signals 15. Alternatively, transmitter assembly 12 could comprise one or more optical sources shared by a plurality of modulators. For example, transmitter assembly 12 could comprise a continuum source transmitter including a mode-locked source operable to generate a series of optical pulses. In that case, transmitter assembly 12 could also include a continuum generator operable to receive a train of pulses from the mode-locked source and to spectrally broaden the pulses to form an approximate spectral continuum of optical signals. In that embodiment, a signal splitter receives the continuum and separates the continuum into individual signals each having a center wavelength. In some embodiments, transmitter assembly 12 can also include a pulse rate multiplexer, such as a time division multiplexer, operable to multiplex pulses received from the mode locked source or the modulator to increase the bit rate of the system.

Transmitters 12 in system 10 can comprise any devices capable of converting electrical signals into optical signals. In various embodiments, transmitters 12 comprise modulated light sources capable of high modulation frequencies (e.g., greater than 2, 4, or even 9.5 gigabits per second or more). Transmitters 12 can comprise externally modulated light sources, or can comprise directly modulated light sources. For example, in some embodiments, at least one transmitter 12a can comprise an electro-absorption modulated laser (EML) capable of modulating at 9.5 gigabits per second or more. In this embodiment, EML 12a comprises a laser diode and an electro-absorption modulator (EAM) located on a common substrate. Locating the laser diode and the EAM on a common substrate is advantageous in allowing relatively inexpensive packaging of EMLs by facilitating formation of arrays of EMLs. In addition, EML's facilitate the use of low drive voltages to modulate the signals.

Although EML's can provide some advantages in at least some embodiments, other types of transmitters, whether directly or externally modulated, could alternatively be used.

To improve system margin, at least a majority of transmitters 12 can implement forward error correction (FEC) to increase the system's tolerance to errors and to improve the Q-factor associated with signals 15. The FEC sequence encoded onto signals 15 may comprise any sequence capable of improving the Q-factor of signals 15. For example, the forward error correction sequence may comprise Reed Solomon coding, Turbo Product Codes coding, Concatonated Reed-Solomon coding, or other algorithms capable of improving the Q-factor of optical signals 15 and the bit error rate of system 10. In some embodiments, system 10 communicates wavelength signals 15 encoded with forward error correction sequences across system 10 while maintaining a bit error rate of $10^{-09}$ or better after forward error correction decoding. For example, a bit error rate of $10^{-12}$ or better can be maintained after forward error correction decoding. Encoding an FEC sequence onto wavelength signals 15 can improve the Q-factor of signal 15 by six (6) decibels or more, in some cases by ten (10) decibels or more.

In the illustrated embodiment, system 10 also includes a combiner 14 operable to receive wavelength signals 15a–15n and to combine those signals into a multiple wavelength signal 16. As one particular example, combiner 14 could comprise a wavelength division multiplexer (WDM). The terms wavelength division multiplexer and wavelength division demultiplexer as used herein may include equipment operable to process wavelength division multiplexed signals and/or equipment operable to process dense wavelength division multiplexed signals.

System 10 communicates multiple wavelength signal 16 over an optical communication medium 20. Communication medium 20 can comprise a plurality of spans 20a–20n of fiber. Fiber spans 20a–20n could comprise standard single mode fiber (SMF), dispersion-shifted fiber (DSF), non-zero dispersion-shifted fiber (NZDSF), dispersion compensating fiber (DCF), or another fiber type or combination of fiber types.

In the illustrated embodiment, each span 20 is coupled to or comprises at least one stage of an optical amplifier. In this example, at least a majority of spans 20a–20n serve as distributed Raman amplification stages, assisting in offsetting losses that would otherwise be experienced by optical signals 15 traversing system 10. In those spans serving as both a transmission medium and an amplification stage, the fiber is pumped to generate Raman gain along at least a portion of the span. Implementing distributed Raman amplification stages in a majority of spans is advantageous in improving the noise figure of system 10. In various embodiments, system 10 uses a distributed Raman amplification stage in at least majority of spans, which can improve the noise figure of system 10 by 6 decibels or more, in some cases by 7.4 decibels or more.

Two or more spans of communication medium 20 can collectively form an optical link. In the illustrated example, communication medium 20 includes a single optical link 25 comprising numerous spans 20a–20n. System 10 could include any number of additional links coupled to link 25. For example, optical link 25 could comprise one optical link of a multiple link system, where each link is coupled to other links through optical regenerators.

In the illustrated embodiment, system 10 comprises an optical system that communicates signal 16 over optical link 25 a link distance 40. In this example, link distance 40 represents a distance between the beginning and end of system 10. In other embodiments, link distance 40 may represent the distance between optical regenerators in a larger multiple optical link system. In various embodiments, link distance 40 can comprise a distance of more than 200 kilometers, 400 kilometers, in some cases over 800 kilometers, or even 1,200 kilometers or more.

In this example, system 10 includes a booster amplifier 18 operable to receive and amplify wavelengths of signal 16 in preparation for transmission over a communication medium 20. Where communication system 10 includes a plurality of fiber spans 20a–20n, system 10 can also include one or more in-line amplifiers 22a–22n. In-line amplifiers 22 couple to one or more spans 20a–20n and operate to amplify signal 16 as it traverses communication medium 20. Optical communication system 10 can also include a preamplifier 24 operable to amplify signal 16 received from a final fiber span 20n. Although optical link 25 is shown to include one or more booster amplifiers 18 and preamplifiers 24, one or more of the amplifier types could be eliminated in other embodiments.

Amplifiers 18, 22, and 24 could each comprise, for example, one or more stages of discrete Raman amplifiers, distributed Raman amplifiers, rare earth doped amplifiers such as an erbium doped or thulium doped amplifier, semiconductor amplifiers or a combination of these or other amplifier types.

Throughout this document, the term "amplifier" denotes a device or combination of devices operable to at least partially compensate for at least some of the losses incurred by signals while traversing all or a portion of optical link 25. Likewise, the terms "amplify" and "amplification" refer to offsetting at least a portion of losses that would otherwise be incurred.

An amplifier may, or may not impart a net gain to a signal being amplified. Moreover, the terms "amplify" and "gain" as used throughout this document, do not (unless explicitly specified) require a net gain. In other words, it is not necessary that a signal experiencing "gain" or "amplification" in an amplifier stage experiences enough gain to overcome all losses in the amplifier stage. As a specific example, distributed Raman amplifier stages typically do not experience enough gain to offset all of the losses in the transmission fiber that serves as a gain medium. Nevertheless, these devices are considered "amplifiers" because they offset at least a portion of the losses experienced in the transmission fiber.

Multiple wavelength signal 16 carries wavelength signals 15a–15n ranging across a relatively wide bandwidth, for example more than thirty-two (32) nanometers. In some cases, wavelength signals 15a–15n may even range across different communications bands (e.g., the short band (S-band), the conventional band (C-band), and/or the long band (L-band)). Depending on the amplifier types chosen, one or more of amplifiers 18, 22, and/or 24 could comprise a wide band amplifier operable to amplify all signal wavelengths received. That is, a single amplifier 18, 22, and/or 24 could operate on a bandwidth signal of wavelengths 15 of, say, 32 nanometers or more, without the need for a signal separator preceding the amplifier and a signal combiner following the amplifier. Using a wide band amplifier as an in-line amplifier 18 is particularly advantageous in enhancing system margin. The use of a wide band amplifier enhances system margin because wide band amplifiers reduce the need for optical components to separate and combine a wide bandwidth optical signal. In some embodiments, system 10 uses wide band amplifiers in a majority of in-line amplification sites, which can improve system margin by as much as three (3) decibels or better, and in some cases by as much as four (4) decibels or better.

In some cases, one or more of those amplifiers could comprise a parallel combination of amplifier assemblies, wherein each amplifier in the parallel combination is operable to amplify a portion of the wavelengths of multiple wavelength signal 16. In that case, system 10 could incorporate signal separators and/or signal combiners surrounding the parallel combinations of amplifier assemblies to facilitate amplification of a plurality of groups of wavelengths prior to combining or recombining the wavelengths for communication through system 10.

Network 10 may further include one or more access elements. For example, the access element could comprise an optical add/drop multiplexer, a cross-connect, or another device operable to terminate, cross-connect, switch, route, process, and/or provide access to and from the optical link and another optical link or communication device. These access elements may, for example, be coupled between spans 21 of link 20. Network 10 may also include one or more lossy elements coupled between spans 21 of the optical link. For example, the lossy element could comprise an isolator, a dispersion compensating element, or a gain equalizer.

In the illustrated embodiment, system 10 also includes a plurality of optical add/drop multiplexers (OADMS) 30. In this example, link 25 supports at least five (5) OADMs 30. One or more of OADMs 30 could comprise channel-by channel OADMs operable to add and/or drop one individual channel from communication link 20. One or more of OADMs 30 could also, or alternatively comprise band OADMs operable to approximately simultaneously add and/or approximately simultaneously drop a plurality of channels. OADMs 30 can facilitate, for example removing channels from communication link 25 for termination at a node local to link 25 and/or adding channels to link 25 created at a node local to link 25. Moreover, OADMs 30 can facilitate adding traffic to link 25 from another communication link or removing traffic from link 25 for routing to another communication link.

In one embodiment, system 10 comprises a plurality of OADMs, each OADM operable to remove one or more wavelength signals $15_{DROP}$ from multiple wavelength signal 16 and to add one or more wavelength signals $15_{ADD}$ to signal 16. Each OADM 30 may comprise any hardware, software, firmware, or combination thereof. In various embodiments, at least some OADMs 30 may comprise static OADMs capable of adding/dropping a predetermined wavelength or wavelengths. In other embodiments, at least some OADMs 30 may comprise tunable OADMs capable of adding/dropping dynamically selectable wavelengths. In one particular embodiment, each OADM 30 could comprise, for example, a low loss thin film filter.

In this example, OADMs 30 reside mid-stage within in-line amplifiers 21a–21n. Although OADMs 30 can reside anywhere in system 10, locating an OADM mid-stage in an in-line amplifier provides an advantage of avoiding noise and non-linearity penalties. For example, if an OADM was placed prior to a first amplification stage 21a, losses would be introduced prior to amplification. In that embodiment, any noise introduced by the OADM would be amplified, degrading the optical signal-to-noise ratio. If an OADM was placed after the final amplification stage 21n, non-linearity penalties could result. The illustrated embodiment advantageously locates the OADM after the first stage 21a of the multiple stage in-line amplifier, and before the last stage 21n of the amplifier. This helps to avoid degrading the optical signal-to-noise ratio and reduces non-linearity penalties.

Not all OADMs 30 in system 10 need be operational at any given time. Moreover, not all OADMs 30 need to add and/or drop signals at their full capacities at all times. For example, some OADMs 30 can be installed in system 10, but may be incapable of providing full, or any add/drop functionality. This may be advantageous, for example, where traffic demands do not, at the time of installation, warrant add/drop functionality at a given network location, but where it is envisioned that add/drop functionality may someday be desired at that location.

The embodiment shown in FIG. 1 provides the ability to bypass some or all add/drop functionality by implementing a removable short circuit 34 coupled between a drop port and an add port of OADM 30. In particular, OADM 30n shows this configuration. If and when it is determined that add/drop functionality is desired at OADM 30n, short circuit 34 can be removed, for example, by cutting circuit 34 to open access to the drop and add ports of OADM 30.

System 10 may also include one or more lossy elements coupled between spans 20 of link 25. For example, the lossy element could comprise a signal separator, a signal combiner, an isolator, a dispersion compensating element, or a gain equalizer.

System 10 also includes a separator 26 operable to separate individual optical signal 15a–15n from multiple wavelength signal 16 received at the end of link 25. Separator 26 can communicate individual signal wavelengths or ranges of wavelengths to a bank of receivers 28 and/or other optical communication paths. Separator 26 may comprise, for example, a wavelength division demultiplexer (WDM). In the illustrated embodiment, receiver 28a is operable to receive and decode the FEC sequence of signal 15a.

Through appropriate choice of system design, system 10 can facilitate managing a system loss budget to ensure that a relatively wide bandwidth of signals (e.g., at least 32 nanometers) separated into a relatively large number of channels (e.g., at least 160 channels) can be communicated distances more than, say, 400 kilometers without optical regeneration while maintaining a bit error rate of $10^{-09}$ or less. For example, a bit error rate of $10^{-12}$ or less can be maintained after forward error correction decoding. At the same time, system 10 facilitates adding and/or dropping channels or bands of channels in at least five (5) nodes along communication link 25. Among the margin conserving techniques utilized, this system implements forward error correction encoding and decoding in at least a majority of the signals, as well as distributed Raman amplification in at least a majority of spans 20 of communication link 25.

Various other embodiments can incorporate additional margin enhancing techniques. The discussion associated with FIGS. 2 through 6 describes example embodiments of various methods of amplifying a wide bandwidth of wavelengths. For example, some embodiments might implement wide band amplifiers in at least a majority of the in-line amplifiers, thereby reducing the need for parallel combinations of narrower band amplifiers surrounded by lossy elements used to separate groups of wavelengths before amplification and to recombine the wavelengths after amplification. The wide band amplifiers can be capable of amplifying, for example, more than 32 nanometers, in some cases more than 60, 80 or even 100 nanometers of bandwidth without the use of signal separators and combiners.

Some embodiments may also, or alternatively, implement one or more dispersion compensation devices to reduce penalties due to chromatic dispersion. The discussion associated with FIGS. 7 through 10 describes example embodiments of various dispersion compensation techniques implementing various dispersion compensation devices. In some cases, system 10 can implement one or more lengths of dispersion compensating fiber as a dispersion compensation technique. In one embodiment, the dispersion compensating fiber can serve as a gain medium in a distributed or discrete Raman amplification stage. In this manner, losses introduced by the dispersion compensating fiber can be at least partially offset by pumping that fiber to generate Raman gain (which may or may not result in a net gain).

Still other embodiments may also, or alternatively, implement low loss band OADMs in a majority of sites along link 25 implementing OADMs. The discussion associated with FIGS. 11 through 14 describes how band OADMs are capable of enhancing system margin. Band OADMs can be implemented, which introduce, for example, two (2) decibels loss or less at each OADM site.

Some embodiments can implement some or all of these additional margin enhancing techniques in combination. A combination of margin enhancing techniques can be selected to provide a balance between maintaining a desired system margin and an acceptable system cost.

Conserving Loss Budget Through Amplifier Design

FIGS. 2a through 2c are block diagrams showing example embodiments of amplifier assemblies implementing parallel combinations of amplifiers. In these examples, each amplifier assembly includes at least two amplifiers, each operable to amplify a portion of the wavelengths of multiple wavelength signal 16 of FIG. 1. Each of the amplifiers in the parallel combination may comprise a single stage narrow band amplifier or a multiple stage narrow band amplifier.

FIG. 2a is a block diagram showing one example of an amplifier assembly 200 implementing parallel combinations of booster amplifiers 218. In the illustrated example, amplifier assembly 200 includes at least a first combiner 214a and a second combiner 214n. Although this example shows two signal combiners 214a and 214n, any additional number of combiners could be used without departing from the scope of the present disclosure. Combiner 214a operates to receive a first plurality of optical signals 215a–215m and to combine those signals into a first multiple wavelength signal 202a. In a similar manner, second combiner 214n operates to receive a second plurality of optical signals $215_{m+1}$–215n and to combine those signals into a second multiple wavelength signal 202n. The structure and function of combiners 214a and 214n, can be substantially similar to combiner 14 of FIG. 1.

In the illustrated example, amplifier assembly 200 also includes at least a first booster amplifier 218a and a second booster amplifier 218n. Although this example shows two booster amplifiers 218a and 218n, any number of additional amplifiers could be used without departing from the scope of the present disclosure. Amplifier 218a operates to receive and amplify multiple of signal 202a. In a similar manner, amplifier 218n operates to receive and amplify signal multiple of 202n. The structure and function of each of booster amplifiers 218a and 218n, can be substantially similar to booster amplifier 18 of FIG. 1. In this example, each narrower band amplifier 218a, 218b need only amplify a portion of the bandwidth of multiple wavelength signal 216.

In the illustrated example, amplification assembly 200 further includes a combiner 217 operable to combine signals 202a and 202n into multiple wavelength signal 216 for transmission over communication medium 220. The structure and function of combiner 217, can be substantially similar to combiner 14 of FIG. 1.

FIG. 2b is a block diagram showing one example of an amplifier assembly 225 implementing parallel combinations of inline amplifiers 222. In the illustrated example, assembly 225 includes a separator 229 operable to receive signal 216 from one of the spans of communications medium 220 and to separate signal 216 into at least a first multiple wavelength signal 204a and a second multiple wavelength signal 204n. Although this example shows multiple wavelength signal 216 being separated into two signals 204a and 204n, separator 229 could separate signal 216 into any number of additional signals without departing from the scope of the present disclosure. The structure and function of separator 229, can be substantially similar to separator 26 of FIG. 1.

In the illustrated example, amplifier assembly 225 also includes at least a first amplifier 222a and a second amplifier 222n. Although this example shows two amplifiers 222a and 222n, any number of additional amplifiers could be used without departing from the scope of the present disclosure. Amplifier 222a operates to receive and amplify multiple of signal 204a. In a similar manner, amplifier 222n operates to receive and amplify multiple of signal 204n. The structure and function of each of amplifiers 222a and 222n, can be substantially similar to amplifier 22 of FIG. 1. Again, each narrower band amplifier 222a, 222b need only amplify a portion of the bandwidths of multiple signal 216.

In the illustrated example, amplification assembly 225 further includes a combiner 231 operable to combine signals 204a and 204n into multiple wavelength signal 216 for transmission over communication medium 220. The structure and function of combiner 231, can be substantially similar to combiner 14 of FIG. 1.

FIG. 2c is a block diagram showing one example of an amplifier assembly 250 implementing parallel combinations of pre-amplifiers 224. In the illustrated example, assembly 250 includes a separator 226 operable to receive signal 216 from the final span of communications medium 220 and to separate signal 216 into at least a first multiple wavelength signal 206a and a second multiple wavelength signal 206n. Although this example shows multiple wavelength signal 216 being separated into two signals 206a and 206n, separator 226 could separate signal 216 into any number of additional signals without departing from the scope of the present disclosure. The structure and function of separator 226, can be substantially similar to separator 26 of FIG. 1.

In the illustrated example, amplifier assembly 250 also includes at least a first pre-amplifier 224a and a second pre-amplifier 224n. Although this example shows two pre-amplifiers 224a and 224n, any number of additional amplifiers could be used without departing from the scope of the present disclosure. Amplifier 224a operates to receive and amplify the portion of the total bandwidth carried by multiple of signal 206a. In a similar manner, amplifier 224n operates to receive and amplify the portion of the total bandwidth carried by multiple of signal 206n. The structure and function of each of pre-amplifier 224a and 224n, can be substantially similar to pre-amplifier 24 of FIG. 1.

In the illustrated example, amplifier assembly 250 further includes at least a first separator 227a and a second separator 227n. Separator 227a separates individual optical signals 215a–215m from first multiple wavelength signal 206a, while separator 227n separates individual optical signals $215_{m+1}$–215n from second multiple wavelength signal 206n. The structure and function of each of separators 227a and 227n, can be substantially similar to separator 26 of FIG. 1.

One mechanism for enhancing system margin is to implement amplifiers that do not require the use of lossy elements, such as signal separators and signal combiners surrounding parallel combinations of narrower band amplifiers. In systems using parallel combination of narrower band amplifiers, the elements used to separate the bandwidth of signals before amplification and to recombine the bandwidth after amplification can result in losses of say, 3–4 decibels or more per amplifier site. Using wider bandwidth amplifiers in at least a majority of the amplification sites can reduce the need for lossy signal separators and combiners, thereby enhancing system margin.

FIGS. 3 through 6 are block diagrams showing example embodiments of amplifiers capable of amplifying relatively large bandwidths. In various embodiments, system 10 of FIG. 1 may implement one or more of the amplifiers described below. Although FIGS. 3 through 6 describe particular examples of wider band amplifiers, other amplifier designs can be implemented without departing from the scope of the present invention. The amplifier designs described with respect to FIGS. 3–6 are for illustrative purposes only. Moreover, although these examples depict single amplifiers operable to amplify all signal wavelengths, a plurality of these wider band amplifiers could be used in parallel, such as shown in FIGS. 2a–2c to further increase the amplifying bandwidth of the system.

FIGS. 3a through 3c illustrate an exemplary embodiment of a multiple stage amplifier 300 including gain profiles 330 and 340 associated with various amplification stages and an overall gain profile 350 for the amplifier. In this particular example, amplifier 300 is capable of amplifying over 160 channels spanning more than 32 nanometers of bandwidth, while maintaining an acceptable signal-to-noise ratio and an approximately flat gain profile.

Conventional designs of multi-stage amplifiers have experienced difficulties in attempting to process wide bandwidths with a signal amplifier while maintaining approximately flat gain profiles, acceptable noise figures, or acceptable bit error rates. For example, in Raman amplifiers, a major culprit in noise figures is the phonon-stimulated optical noise created when wavelength signals being amplified reside spectrally close to pump wavelengths used for amplification. The embodiment shown in FIG. 3a reduces adverse effects of this noise by enhancing the Raman amplification of signal wavelengths near the pump wavelengths to overcome the effects of the noise. This embodiment applies an approximately complementary gain profile in another stage of the amplifier to result in an approximately flat overall gain profile with a reduced noise figure.

Throughout this description, the phrase "approximately complementary" refers to a situation where, at least in general, wavelength signals that are more highly amplified in a first stage are less amplified in a second complementary stage, and wavelength signals that are more highly amplified in the second stage are less amplified in the first stage. Note that the use of the terms "first" and "second" to describe the amplifier stages here is not meant to specify any particular order of stages in the amplifier. Two gain profiles said to be "approximately complementary" need not have equal and opposite slopes. Moreover, equal amplification of any particular wavelengths in both gain profiles does preclude those gain profiles from being "approximately complementary."

Approximately complementary gain profiles may have one or more slopes associated with each gain profile. For example, approximately complementary gain profiles could comprise a "W" shaped profile followed by an "M" shaped profile, or an "M" shaped profile followed by a "W" shaped profile. Furthermore, the approximately complementary gain profiles may become approximately complementary only after traversing all or a portion of the transmission medium. In those cases, the gain profiles launched at the beginning of the amplifier stage may not be approximately complementary, but may become approximately complementary after signals traverse all or a portion of the transmission medium.

While best results are obtained by applying approximately complimentary gain profiles to all or nearly all of the same signal wavelengths, some portion of wavelengths can be omitted from one gain profile and included in the other gain profile without departing from the scope of this invention.

In this example, amplifier 300 comprises a two-stage amplifier having a first stage 312 and a second stage 314 cascaded with first stage 312. There is no limit to a particular number of amplifier stages. For example, additional amplification stages could be cascaded onto second stage 314. Moreover, although the illustrated embodiment shows second stage 314 cascaded directly to first stage 312, additional amplification stages could reside between first stage 312 and second stage 314 without departing from the scope of the disclosure.

Amplifier 300 could comprise a distributed Raman amplifier, a discrete Raman amplifier, a hybrid Raman amplifier having both discrete and distributed stages, a rare earth doped amplifier, a semiconductor amplifier, or another amplifier type or combination of amplifier types. Each stage 312, 314 of amplifier 300 includes an input operable to receive a multiple wavelength optical input signal 316. As a particular example, signal 316 could include wavelengths ranging over 32 nanometers, in some cases over 60, 80 or even 100 nanometers.

Each stage 312, 314 also includes a gain medium 320, 321. Depending on the type of amplifier being implemented, media 320, 321 may comprise, for example a gain fiber or a transmission fiber. In some embodiments, all or portions of media 320, 321 may comprise dispersion compensating fibers.

Each stage 312, 314 further includes one or more wavelength pumps 322. Pumps 322 generate pump light 324 at specified wavelengths, which are pumped into distributed gain media 320, 321. Pumps 322 may comprise, for example, one or more laser diodes. Although the illustrated embodiment shows the use of counter propagating pumps, under at least some circumstances using a relatively quiet pump, co-propagating pumps could also be used without departing from the scope of the disclosure.

In one particular embodiment, pump wavelengths 324 can be selected so that the longest wavelength pump signal 324 has a wavelength that is shorter than the shortest wavelength of signal 316. As one specific example, the longest wavelength of pump light 324 could be selected to be, for example, at least ten (10) nanometers shorter than the shortest wavelength of signal 316. In this manner, amplifier 300 can help to avoid phonon stimulated noise that otherwise occurs when pump wavelengths interact with wavelengths of the amplified signal.

Couplers 318b and 318c couple pump wavelengths 324a and 324b to gain distributed media 320 and 325, respectively. Couplers 318 could comprise, for example, wavelength division multiplexers or optical couplers. A lossy element 326 can optionally reside between amplifier stages 312 and 314. Lossy element 326 could comprise, for example, an isolator, an optical add/drop multiplexer, or a gain equalizer.

The number of pump wavelengths 324, their launch powers, their spectral and spatial positions with respect to other pump wavelengths and other wavelength signals, and the bandwidth and power level of the signal being amplified can all contribute to the shape of the gain profile for the respective amplifier stage.

FIG. 3b shows exemplary gain profiles for first stage 312 and second stage 314. Gain profile 330 shows the overall gain of first stage 312 of amplifier 300 for a bandwidth ranging from the shortest wavelength of signal 316 ($\lambda_{sh}$) to the longest wavelength of signal 316 ($\lambda_{lg}$). Gain profile 340 shows the overall gain of second stage 314 of amplifier 300 for a bandwidth ranging from the shortest wavelength of signal 316 ($\lambda_{sh}$) to the longest wavelength of signal 316 ($\lambda_{lg}$). Each of gain profiles 330 and 340 reflects the effects of the other gain profile acting upon it.

In this example, gain profile 330 of first stage 312 has primarily a downward slope, where a majority of the shorter signal wavelengths 316 are amplified more than a majority of the longer signal wavelengths 316. Gain profile 340 of second stage 314 is approximately complimentary to gain profile 330 of first stage 312. In this case, gain profile 340 exhibits primarily an upward slope where a majority of the longer signal wavelengths 316 are amplified more than a majority of the shorter signal wavelengths 316.

Although gain profiles 330 and 340 are, for simplicity, depicted as each having substantially one slope, the slope of each gain profile may change numerous times. Moreover, it is not necessary that the entire slope of gain profile 330 be negative, or that the entire slope of gain profile 340 be positive. Each profile may exhibit any number of peaks and valleys over the amplified bandwidth.

Gain profile 350 represents an exemplary overall gain profile of amplifier 300 resulting from the application of gain profiles 330 and 340 to signal 316. Overall gain profile 350 is approximately flat over at least substantially all of the bandwidth of wavelengths within signal 316.

This particular example provides a significant advantage in reducing the peak noise figure associated with the amplifier using complementary gain profiles. The complementary gain profiles reduce the peak noise figure by amplifying signals closest to the pump wavelengths at higher levels the signals at wavelengths far from the pump wavelengths. In addition, the noise figure is reduced by amplifying longer wavelength signals in a later amplifier stage. Moreover, implementing varying launch powers reduces the total launched signal power, which, in Raman amplifiers, reduces noise generated from the signal—signal interactions. In a discrete amplifier embodiment, using this type of configuration, the noise figure of amplifier 300 in the small signal limit can be reduced to less than eight decibels, in some cases 7 decibels, even where the bandwidth of signal 316 exceeds 100 nanometers.

Complementary gain profiles can also be used to reduce the pump power requirements for a given amplifier, thus creating a high efficiency amplifier.

FIGS. 4a through 4c illustrate a high pump efficiency embodiment of a multiple stage wide band amplifier 400 including exemplary gain profiles 430 and 440 associated with various amplification stages and an overall gain profile 450 for the amplifier. In this example, amplifier 400 is capable of amplifying over 160 channels spanning more than 32 nanometers of bandwidth while maintaining an acceptable signal-to-noise ratio and an approximately flat gain profile.

Amplifier 400 shown in FIG. 4a is similar in structure and function to amplifier 300 shown in FIG. 3a. Like amplifier 300 shown in FIG. 3a, amplifier 400 of FIG. 4a includes a first amplification stage 412 and a second amplification stage 414. Each of stages 412 and 414 includes a gain medium 420, 421, respectively, which is operable to receive multiple wavelength input signal 416 and pump wavelengths 424a and 424b, respectively.

Each amplifier stage 412 and 414 operates to amplify wavelengths of signal 416 according to gain profiles 430 and 440 as shown. In this example, at least first stage 412 comprises a Raman amplification stage. Second stage 414 could comprise a Raman amplification stage, or another type of amplification stage.

The example shown in FIG. 4 differs from the example shown in FIG. 3 in that gain profile 430 (shown in FIG. 4b) of first stage 412 exhibits primarily an upward slope where a majority of longer wavelengths of signal 416 are amplified more than the majority of shorter wavelengths of signal 416. Conversely, gain profile 440 of second stage 414 comprises an approximately complementary gain profile to first gain profile 430 of first stage 412. Profile 440 applies a higher gain to a majority of shorter wavelengths than the gain applied to the majority of longer signal wavelengths 416. In addition, in this embodiment, the power of pumps 422a driving first gain profile 430 can be reduced.

The Raman scattering effect transfers energy from shorter wavelength signals to longer wavelength signals. This embodiment leverages that fact to allow the longer pump wavelengths of Raman first stage 412 to accept energy from the shorter pump wavelengths of second stage 414. In a particular embodiment, amplifier 400 may include a shunt 460 between second gain medium 421 and first gain medium 420 to facilitate the longer pump wavelengths of first stage 412 accepting power from the shorter pump wavelengths of second stage 414. The combined effects of first stage 412 and second stage 414 result in an overall gain profile 450 (FIG. 4c) of the amplifier that remains approximately flat.

This embodiment provides significant advantages in terms of efficiency by allowing the use of fewer wavelength pumps 422a in the first stage 412, and/or also by allowing each pump 422a to operate at a lower launch power. By selecting signal launch powers with reference to the noise figure of the amplifier, this embodiment enjoys the further efficiency of reduced overall launched signal power.

The embodiment shown in FIG. 4a can also provide improvements for the noise figure of the amplifier. For example, phonon stimulated noise is created in Raman amplifiers where wavelengths being amplified spectrally reside close to a wavelength of pump signals 424. By spectrally separating pump wavelengths 424 from signal wavelengths 416, phonon stimulated noise can be reduced.

In a particular embodiment, pump wavelengths 424 are selected to have wavelengths at least ten (10) nanometers shorter than the shortest wavelength in signal 416 being amplified. Moreover, in a particular embodiment, second stage 414, where a majority of the gain to short wavelengths of signal 416 is applied, comprises the last stage of amplifier 400.

Although the embodiments shown in FIGS. 3–4 show two complementary amplification stages, additional complementary amplification stages could also be implemented.

FIGS. 5a through 5c illustrate a three-stage amplifier, gain profiles associated with various stages of the amplifier, and a composite gain of the amplifier respectively. In this example, amplifier 500 includes three amplification stages 512, 514, and 515. At least second amplifier stage 514 comprises a Raman amplification stage.

FIG. 5a is a block diagram of a three stage amplifier 500 including gain profiles 530, 540, and 545 associated with various amplification stages, and an overall gain profile 550 for the amplifier. Amplifier 500 is similar in structure and function to amplifier 300 of FIG. 3 but includes three cascaded amplification stages 512, 514, and 515. Each of amplifier stages 512–515 includes a gain medium 520, 521, 523, respectively, which operates to receive multiple wavelength signal 516 and pump wavelengths 524a–524c from pumps 522a–522c. Each amplifier stage includes an optical coupler operable to introduce pump wavelengths 524 to the respective gain media. In some embodiments, lossy elements 526 may reside between one or more amplification stages 512–515. Lossy elements 526 may comprise, for example, optical add/drop multiplexers, isolators, and/or gain equalizers.

In this particular example, first stage 512 and second stage 514 operate in a similar manner to amplifier 300 shown in FIG. 3a. In particular, first stage 512 applies a gain profile 530 that amplifies a majority of shorter signal wavelengths 516 more than it amplifies a majority of longer signal wavelengths 516. Second stage 514, conversely, applies and approximately complimentary gain profile 540 to signal 516, where the majority of longer wavelengths of signal 516 are amplified more than a majority of shorter wavelengths of signal 516.

The combination of second stage 514 and third stage 515, on the other hand, operates similarly to amplifier 400 shown in FIG. 4a. While second stage 514 applies gain profile 540 amplifying a majority of longer signal wavelengths 516 more than a majority of shorter signal wavelengths 516, third stage 515 applies to gain profile 545, which amplifies a majority of shorter signal wavelengths 516 more than a majority of longer signal wavelengths 516. The composite gain profile 550 (shown in FIG. 5c) resulting from the combination of amplifications in first, second, and third amplifier stages of amplifier 500 results in an approximately flat overall gain profile for the amplifier.

This particular example reaps the efficiency benefits discussed with respect to FIG. 4, and permits use of the noise figure reduction techniques discussed with respect to FIGS. 3 and 4. For example, efficiency advantages are realized by allowing longer pump wavelengths 524b of second stage 514 to accept power from high powered shorter pump wavelengths 524c of third amplification stage 515. This results from the Raman effect wherein longer wavelength signals accept energy from shorter wavelength signals. As a result, second stage 514 can be operated with fewer wavelength pumps than what otherwise be required, and also with lower pump launch powers.

In terms of improvements in noise figure, the gain profiles of first stage 512 compared to second stage 514 result in high amplification of shorter wavelengths of signal 516 to overcome phonon stimulated noise associated with interaction of those signals with the longer pump wavelengths 524a. In addition, providing a significant amount of amplification to shorter wavelengths of signal 516 in the last stage 515 of amplifier 520 helps to minimize the noise figure associated with amplifier 500.

Moreover, applying varied signal launch powers depending at least in part on the noise figure of the amplifier results in reducing the total signal launch power, further increasing the efficiency of the system.

FIGS. 6a through 6c illustrate a four-stage amplifier, gain profiles associated with various stages of the amplifier, and a composite gain of the amplifier respectively. In this example, amplifier 600 includes four amplification stages 612, 614, 615, and 617. At least third stage 615 comprises a Raman amplification stage.

As shown in FIG. 6b, first stage 612 applies a gain profile 630 where a majority of shorter signal wavelengths are amplified more than a majority of longer signal wavelengths, and second stage 614 applies an approximately complimentary gain profile 635 where a majority of longer signal wavelengths are amplified more than a majority of shorter signal wavelengths. In this particular embodiment, the composite gain from first stage 612 and second stage 614 results in an approximately flat overall gain profile at the output of second stage 614.

Because the composite gain curve for the amplifier is approximately flat, this design advantageously facilitates addition and subtraction of particular wavelengths of signal 616 without the need for further manipulation of the gain. In addition, first and second gain stages 612 and 614 provide a low noise figure, reducing the effects of phonon stimulated noise in shorter wavelength signals closest to the pump wavelengths.

Particular wavelengths of signal 616 may be substituted with other wavelengths at access element 626b. After processing by access element 626b, signal 616 continues to third amplification stage 615, where gain profile 640 is applied as shown in FIG. 6b. Signal 616 is then communicated to fourth stage 617 where gain profile 645 is applied to wavelengths of signal 616. Amplified signal 616 is then output at output port 665.

Third and fourth amplification stages of amplifier 600 are similar in structure and function to amplifier 400 described with respect to FIG. 4. Through the use of this configuration, third and fourth amplifier stages 615 and 617 provide increased efficiency in operation. In particular, pump 622 can operate with fewer pump signals and/or lower pump power as a result of the Raman scattering effect which allows longer pump wavelengths 624c of Raman third stage 615 to accept power from shorter pump wavelengths 624d of fourth amplification stage 617. Moreover, third and fourth amplification stages 615 and 617 assist in maintaining a low noise figure by applying a significant amount of the gain to the shortest wavelengths of signal 616 at the last amplifier stage 617.

As in other embodiments, applying varied signal launch powers depending at least in part on the noise figure of the amplifier results in reducing the total signal launch power, further increasing the efficiency of the system.

Amplifiers depicted in FIGS. 3–6 can comprise wide band amplifiers operable to receive and amplify a relatively large bandwidth of wavelength signals 15. In particular embodiments, the amplifiers can process over 32 nanometers, in some cases more than 60, 80, or even 100 nanometers of bandwidth while maintaining an approximately flat overall gain profile over the bandwidth of amplified signal wavelengths 16.

Throughout this document, the term "approximately flat overall gain profile" describes a condition where the maximum signal gain at the output of the amplifier differs from the minimum signal gain at the output of the amplifier by no more than an amount suitable for use in telecommunication systems over an operational bandwidth of information carrying channels. Deviation of the maximum and minimum signal gain over one or two of several channels is not intended to be outside of the scope of an approximately flat overall gain profile. The deviation between minimum and maximum signal gains may comprise, for example five (5) decibels prior to application of any gain flattening filters over an operational bandwidth of, for example, 32 nanometers or more. Particular embodiments of the invention may achieve gain flatness of approximately three (3) decibels or less before application of any gain flattening filters over an operational bandwidth.

Conserving Loss Budget Through Dispersion Compensation

Another way to conserve a system's loss budget is to address penalties associated with chromatic dispersion. In many cases, it may be desirable to use inexpensive components, such as electro-absorption based modulated light sources. When these sources are driven at bit rates of, say, 10 gigabits or higher, they typically exhibit significant chirp, resulting in losses due to chromatic dispersion and nonlinearity penalties.

For this reason, typical systems have not experienced much success in communicating large numbers of channels occupying wide bandwidths over long distances at high bit rates, at least not when using relatively inexpensive components. One aspect of this disclosure recognizes that inexpensive components can be used while maintaining a given loss budget, by augmenting the use of those components with one or more dispersion compensating techniques.

FIGS. 7 though 10 are block diagrams showing example embodiments of various dispersion compensation techniques. The use of one or more dispersion compensation techniques can be used in combination with either the parallel combinations of amplifiers as shown in FIG. 2, or the wider bandwidth amplifiers as shown in FIGS. 3 through 6. The use of one or more dispersion compensation techniques is particularly advantageous when at least a portion of communication link 20 comprises a chromatic dispersion having a magnitude of no less than 6 pico-seconds per nanometer-kilometer in at least one optical signal.

In various embodiments, system 10 of FIG. 1 may implement one or more of the dispersion compensation techniques described below at various system locations. For example, system 10 can implement the techniques as part of a pre-compensation, an in-line compensation, and/or a post-compensation technique. As used throughout this document, the term "pre-compensation" refers to a dispersion compensation technique implemented within system 10 in or between transmitters 12 and first fiber span 20a. The term "in-line dispersion compensation" refers to a dispersion compensation technique implemented within system 10 in or between first fiber span 20a and final fiber span 20n. The term "post-compensation" refers to a dispersion compensation technique implemented within system 10 in or between receivers 28 and final fiber span 20n.

In one particular embodiment, system 10 comprises a dispersion-managed system capable of substantially reducing linear penalties associated with chromatic dispersion. As used throughout this document, the term "dispersion managed system" refers to a system that maintains a relatively low mean dispersion throughout at least a portion of the system. A dispersion-managed system can manage chromatic dispersion throughout the system by, for example, implementing pre-compensation, in-line compensation, and/ or post-compensation dispersion compensation techniques. The use of a dispersion-managed system can be particularly advantageous where system 10 uses EMLs in at least a majority of transmitters 12. A dispersion-managed system substantially reduces the linear penalties associated with EMLs, and substantially prevents phase matching of the optical signals and four wave mixing.

FIG. 7 is a block diagram of one example of a dispersion compensation system 700 implementing at least one chirped Bragg grating. In the illustrated example, dispersion compensation system 700 includes an amplifier 722 operable to amplify multiple wavelength signal 716 received from communication medium 720 and to at least partially compensate for chromatic dispersion associated with signal 716. Although amplifier 722 is depicted as an in-line amplifier, amplifier 722 could be configured to be used as a booster amplifier or a pre-amplifier without departing from the scope of the present disclosure. The structure and function of amplifier 722 can be substantially similar to amplifiers 18, 22, and 24 of FIG. 1. In this example, multiple wavelength signal 716 comprises a plurality of individual wavelengths ($\lambda_{all}$) Each of the plurality of individual wavelengths travels at a different speed ranging from the slowest wavelength ($\lambda_{slow}$) to the fastest wavelength ($\lambda_{fast}$).

In this example, amplifier 722 includes at least a first amplification stage 721a and a second amplification stage 721n. Although this example includes two amplification stages 721a and 721n, any number of additional amplification stages could be used without departing from the scope of the present disclosure. Amplification stages 721a and 721n each operate to receive and amplify multiple wavelength signal 716.

Amplifier 722 also includes a dispersion compensation element 760 operable to at least partially compensate for chromatic dispersion associated with multiple wavelength signal 716. In this embodiment, dispersion compensation element 760 comprises a chirped Bragg gating. Dispersion compensation element 760 comprises a circulator 761 and a plurality of reflective elements 762. Circulator 761 operates to direct multiple wavelength signal 716 to the plurality of reflective elements 762a–762n. Although this example uses a circulator 761 to direct signal 716, other elements, such as an optical coupler, could be used without departing from the scope of the present disclosure. In this particular example, each of the plurality of reflective elements 762 comprises a different periodicity and operates to reflect at least one wavelength signal from multiple wavelength signal 716 for recombination into multiple wavelength signal 716.

In operation, circulator 761 receives multiple wavelength signal 716. Circulator 761 directs each of the plurality of individual wavelength signals ($\lambda_{all}$) to the first of the plurality of reflective elements 762a–762n. Each reflective element 762 reflects one of the plurality of individual wavelengths. The plurality of reflective elements 762 are arranged such that the slower individual wavelength signals travel a shorter distance than the faster individual wavelength signals travel. In the illustrated embodiment, reflective element 762a reflects the slowest individual wavelength ($\lambda_{slow}$), while element 762n reflects the fastest individual wavelength ($\lambda_{fast}$). Reflecting each individual wavelength signal in this manner at least partially compensates for chromatic dispersion associated with multiple wavelength signal 716.

Although this example uses a circulator 761 and a plurality of reflective elements 762 as dispersion compensating element 760, other dispersion compensation devices could be used without departing from the scope of the present disclosure. For example, higher-order mode fiber, bulk optics, dispersion compensating fiber, or interferometric devices could be used. Moreover, although this example shows dispersion compensation element 760 as residing within an amplifier 722, dispersion compensation element 760 could alternatively reside elsewhere within the system.

In the illustrated embodiment, circulator 760 directs all wavelengths of multiple wavelength signal 716 to the plurality of gratings 762. In an alternative embodiment, amplifier 722 could comprise a plurality of circulators, each comprising a plurality of gratings. In that example, each circulator is operable to direct a portion of the wavelengths of multiple wavelength signal 716 to its respective plurality of gratings. Providing a plurality of circulators can be advantageous in improving the linear compensation of a larger bandwidth.

Another mechanism for enhancing system margin is to implement dispersion compensating fiber as the gain medium of a Raman amplifier stage. In an optical communication system implementing a relatively wide bandwidth, chirped Bragg gratings can result in slope and ripple problems in the wide bandwidth optical signal. The grating used to reflect the individual wavelength signals can result in losses of say, 6–10 decibels or more per dispersion compensation site.

Dispersion compensating fiber, too, can introduce losses into the optical signals. Dispersion compensating fibers typically used today often introduce approximately 10 decibel loss. These losses can be at least partially offset, however, by using dispersion compensating fiber as at least a portion of the gain medium in at least some of the Raman amplifier stages or by implementing a Raman pump in conjunction with the dispersion compensating fiber. In some embodiments, using dispersion compensating fiber as the gain medium in each Raman amplification stage enables a net gain or at least a transparent effect on system margin. In other embodiments, using dispersion compensating fiber as at least a portion of the gain medium in each Raman amplifier stage offsets at least five (5) decibels of loss associated with the dispersion compensating fiber.

FIG. 8 is a block diagram of one example of a dispersion compensation system 800 implementing dispersion compensating fiber as at least a portion of the gain medium within a Raman amplification stage. In the illustrated example, dispersion compensation system 800 includes an amplifier stage 822 operable to amplify multiple wavelength signal 816 received from communication medium 820 and to at least partially compensate for chromatic dispersion associated with signal 816. At the same time, amplifier 822 offsets at least a portion of the losses otherwise associated with the dispersion compensating fiber.

Amplifier stage 822 can comprise a discrete or distributed Raman amplification stage. Although amplifier stage 822 is depicted as an inline amplifier stage, amplifier stage 822 could be configured to be used as a booster amplifier or a pre-amplifier without departing from the scope of the present disclosure.

In this example, amplifier stage 822 includes a dispersion compensation element 808. Dispersion compensation element 808 comprises a length of dispersion compensating fiber serving as at least a portion of a gain medium for amplifier stage 822. Where amplifier stage 822 comprises a discrete Raman amplifier stage, dispersion compensating fiber 808 could comprise all or a portion of the discrete gain medium for the stage. Where amplifier stage 822 comprises a distributed Raman amplifier stage, dispersion compensating fiber 808 could comprise all or a portion of the transmission fiber serving as the gain medium for the amplifier stage.

Amplifier 822 stage includes at least one wavelength pump assembly 823 operable to generate light 824 at one or more specified wavelengths, which are pumped to gain medium 808. Although this particular example shows a counter-propagating pump source, counter-propagating source or a combination of counter-propagating and co-propagating pump sources could be used. The structure and function of pump assembly 823 can be substantially similar to pump 322 of FIG. 3. In this example, amplifier stage 822 also includes at least one coupler 818 operable to couple pump wavelength 824 to gain medium 808. The structure and function of coupler 818 can be substantially similar to coupler 318 of FIG. 3.

In this example, amplifier 822 comprises a single stage Raman amplifier. In an alternative embodiment, amplifier stage 822 could comprise one stage of a multiple stage amplifier cascaded with other Raman or other amplifier type stages. In one example, amplifier 822 could comprise either first stage 312 or second stage 314 of FIG. 3. In another example, each of first stage 312 and second stage 314 of FIG. 3 comprise an amplifier, such as amplifier stage 822. Signal 816 could include wavelengths ranging from over 32 nanometers, and in some cases over 60, 80, or even 100 nanometers.

FIG. 9 is a block diagram of one example of a dispersion compensation system 900 implementing dispersion compensating fiber within a multiple stage amplifier 122. In this example, compensation system 900 includes a multi-stage amplifier 122 operable to receive and amplify multiple wavelength signal 916 and to at least partially compensate for chromatic dispersion associated with signal 916. As a particular example, signal 916 could include wavelengths ranging from over 32 nanometers, and in some cases over 60, 80, or even 100 nanometers.

In the illustrated embodiment, multi-stage amplifier 122 includes at least a first stage 922a and a second stage 922n cascaded with first stage 922a. Although this example shows two stages 922a and 922n, any additional number of stages could be used without departing from the scope of the present disclosure. For example, additional amplification stages could be cascaded onto second stage 922n. Moreover, although the illustrated embodiment shows second stage 922n cascaded directly to first stage 922a, additional amplification stages could reside between first stage 922a and second stage 922n without departing from the scope of the present disclosure. Each stage 922a and 922n is operable to receive and amplify multiple wavelength signal 916. In this example, first stage 922a comprises a distributed Raman amplifier, while second stage 922n comprises a discrete Raman amplifier.

In the illustrated example, one or both of amplification stages 922a and 922n can also operate to at least partially compensate for chromatic dispersion associated with signal 916. First stage 922a and/or second stage 922n can include a dispersion compensation element 908 operable to at least partially compensate for chromatic dispersion associated with multiple wavelength signal 916. In this example, dispersion compensation element 908 can comprise a length of dispersion compensating fiber serving as a gain medium within one or both of stages 922a and 922n. For example, all or a portion of the gain medium of first stage 922a could comprise a length of dispersion compensating transmission fiber operable to at least partially counteract chromatic dispersion that would otherwise be associated with signal 916. In that example, the gain medium comprises at least a portion of communications medium 920. In addition, or alternatively, the second stage 922n could comprise a dispersion compensating fiber operable to at least partially counteract chromatic dispersion that would otherwise be associated with signal 916.

Amplifier 122 further includes at least a first wavelength pump assembly 923a and a second wavelength pump assembly 923n. Although this example show two wavelength pump assemblies 923a and 923n, any additional number of pump assemblies could be used without departing from the scope of the present disclosure. First wavelength pump assembly 923a operates to generate light 924a at one or more specified wavelengths, which are pumped to gain medium 908a. In a similar manner, pump assembly 923n operates to generate light 924n, which is pumped to gain medium 908n. The structure and function of pump assemblies 923a and 923n can be substantially similar to pump assembly 322 of FIG. 3.

In this example, amplifier 122 also includes a first coupler 918a and a second coupler 918n. Although this example show two couplers 918a and 918n, any additional number of couplers could be used without departing from the scope of the present disclosure. First coupler 918a operates to couple pump wavelength 924a to gain medium 908a. In a similar manner, coupler 918n operates to couple pump wavelength 924n to gain medium 908n. The structure and function of couplers 918a and 918n can be substantially similar to coupler 318 of FIG. 3.

Figure 10:
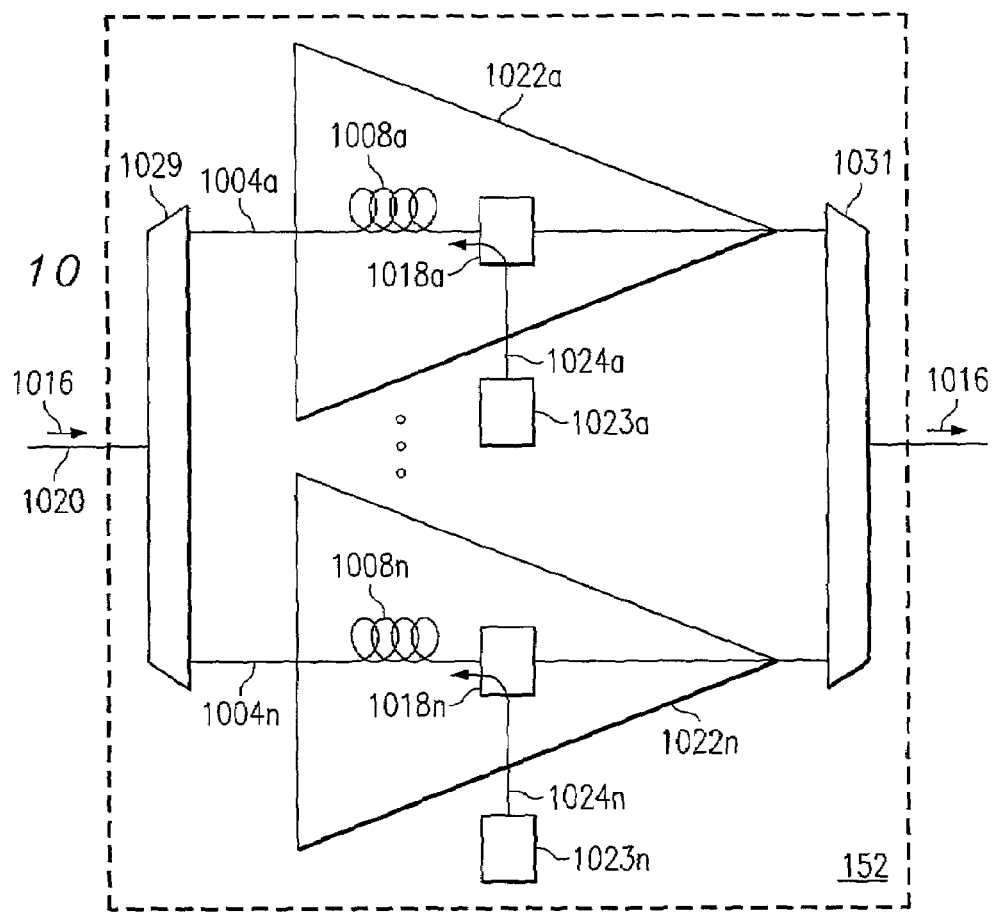
FIG. 10 is a block diagram of one example of a dispersion compensation technique implementing parallel combinations of dispersion compensating fiber within an in-line amplifier.

FIG. 10 is a block diagram of one example of a dispersion compensation system 1000 implementing parallel combinations of dispersion compensating fiber within an in-line amplifier 152. In the illustrated example, dispersion compensation system 1000 includes a separator 1029 operable to receive signal 1016 from one of the spans of communications medium 1020 and to separate signal 1016 into at least a first multiple wavelength signal 10024a and a second multiple wavelength signal 1004n. Although this example shows multiple wavelength signal 1016 being separated into two signals 1004a and 1004n, separator 1029 could separate signal 1016 into any number of additional signals without departing from the scope of the present disclosure. The structure and function of separator 1029, can be substantially similar to separator 26 of FIG. 1.

In the illustrated example, dispersion compensation system 1000 also includes at least a first amplifier 1022a and a second amplifier 1022n. Although this example shows two amplifiers 1022a and 1022n, any number of additional amplifiers could be used without departing from the scope of the present disclosure. Amplifier 1022a operates to receive and amplify multiple of signal 1004a. In a similar manner, amplifier 1022n operates to receive and amplify multiple of signal 1004n. The structure and function of each of amplifiers 1022a and 1022n, can be substantially similar to amplifier 22 of FIG. 1.

In the illustrated example, amplifiers 1022a and 1022n also operate to at least partially compensate for chromatic dispersion associated with signal 1004a and 1004n, respectively. In this example, amplifier 1022a includes a first dispersion compensation element 1008a, and amplifier 1022n includes a second dispersion compensation element 1008n. Dispersion compensation elements 1008a and 1008n each comprise a length of dispersion compensating fiber serving as at least a portion of a gain medium within amplifiers 1022a and 1022n, respectively. Element 1008a operates to receive first multiple wavelength signal 1004a and at least partially compensates for a chromatic dispersion associated with signal 1004a. In a similar manner, element 1008n operates to receive second multiple wavelength signal 1004n and at least partially compensates for chromatic dispersion associated with signal 1004n.

First amplifier 1022a further includes a first wavelength pump 1023a and second amplifier 1022n includes a second wavelength pump 1023n. First wavelength pump 1023a operates to generate light 1024a at specified wavelengths, which is pumped to dispersion compensation element 1008a. In a similar manner, pump 1023n operates to generate light 1024n, which is pumped to dispersion compensation element 1008n. The structure and function of pumps 1023a and 1023n can be substantially similar to pump 322 of FIG. 3.

In this example, first amplifier 1022a also includes at a first coupler 1018a and second amplifier 1022n includes a second coupler 1018n. First coupler 1018a operates to couple pump wavelength 1024a to dispersion compensation element 1008a. In a similar manner, coupler 1018n operates to couple pump wavelength 1024n to dispersion compensation element 1008n. The structure and function of couplers 1018a and 1018n can be substantially similar to coupler 318 of FIG. 3.

Dispersion compensation system 1000 further includes a combiner 1031 operable to combine signals 1004a and 1004n into multiple wavelength signal 1016 for transmission over communication medium 1020. The structure and function of combiner 1031, can be substantially similar to combiner 14 of FIG. 1.

Separating multiple wavelength signal 1016 into multiple wavelength signals 1004a and 1004n enables the formation of parallel paths of dispersion compensation. Implementing parallel paths of dispersion compensation is advantageous in enabling the application of different compensation profiles to different sets of optical wavelengths within multiple wavelength signal 1016.

The illustrated embodiment implements parallel paths of dispersion compensation in an in-line amplification assembly. In alternative embodiments, parallel paths of dispersion compensation can be implements in a booster amplification assembly or in a pre-amplification assembly. For example, first amplifier 1022a could comprise first booster amplifier 218a of FIG. 2a, while second amplifier 1022n could comprise second booster amplifier 218n of FIG. 2a.

Conserving Loss Budget Through OADM Design

Optical add/drop multiplexers (OADMs) used in optical communication networks are capable of removing wavelength channels from multiple wavelength signals and adding channels to those signals. OADMs in an optical communication networks can comprise channel-by-channel OADMs operable to add and/or drop one individual channel from the multiple wavelength signal communicated across the system.

Channel-by-channel OADMs can include, for example, one or more fiber Bragg gratings each operable to reflect a particular optical signal wavelength from the multiple wavelength signal, and one or more drop circulators each operable to drop an individual optical signal wavelength reflected from the fiber Bragg grating. Channel-by-channel OADMs can further include one or more add circulators each operable to add a particular optical signal wavelength to the multiple wavelength signal.

Channel-by-channel OADMs can result in losses of say, 6–10 decibels per OADM site. Conventional optical communication systems have generally sought to limit the number of nodes that perform optical add/drop multiplexing to avoid excessive loss in the optical signals. These systems may be limited, for example, to one or two OADMs per optical link. As discussed above, through appropriate choice of other system components, such as amplifier design or use of dispersion compensating elements, a number of channel-by-channel OADMs can be implemented in system 10, while maintaining a desired loss budget. In those designs, a greater portion of the system budget is allocated to the OADM losses, and other system components are selected to ensure compliance with the overall loss budget. The following discussion identifies yet another way to further conserve system loss budget, by implementing lower loss OADMs.

Conventional design wisdom focuses on insertion losses or contrast ratio as the primary impediments to implementing OADMs in multiple nodes along a communication link. One aspect of this disclosure identifies spectral distortion, separate from insertion losses, as a major culprit in OADM losses. Some embodiments of this disclosure seek to control spectral distortion through the use of band OADMs and the use of one or more sacrificial guard-channels between bands of information bearing signals. By controlling the amount of spectral distortion, these embodiments facilitate utilizing numerous OADMs in a single optical link. Some embodiments can sufficiently control spectral distortion to allow use of band OADMs in some, most, or even all nodes of a multiple span communication link.

This disclosure recognizes that spectral distortion can arise, for example, from signal asymmetry induced by OADMs. As used in this document, the term "signal asymmetry" refers to a distorting effect experienced by frequency components of pass-through wavelength signals when wavelengths adjacent to the pass-through wavelength signals are dropped.

Figure 11:
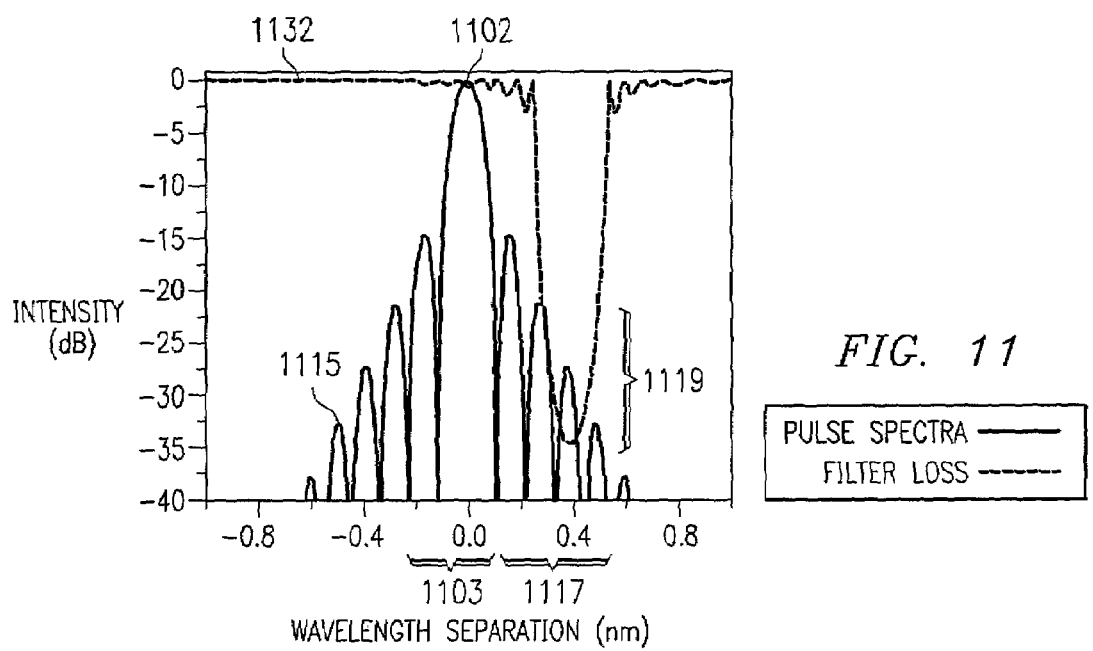
FIG. 11 is a graph showing a spectral response of one embodiment of an optical add/drop multiplier.

FIG. 11 is a graph showing how even a filter function with a relatively steep side-band roll-off can create an asymmetry in a wavelength signal adjacent to the wavelength signal being dropped. In this example, line 1115 illustrates a spectrum of a wavelength signal adjacent to the wavelength signal selected to be dropped. In this example, channel spacing is assumed to be 0.4 nanometers. Line 1132 represents a filter function of an OADM configured to drop a wavelength signal adjacent to signal 1115 shown in FIG. 11. As can be seen in this figure, filter function 1132 will affect a portion 1119 of the side-band 1117 of signal 1115 closest to the adjacent wavelength signal being dropped. In this case, portion 1119 of side-band 1117 is attenuated by filter function 1132, which comprises asymmetric spectral distortion associated with OADMs. In addition, filter function 1132 of the OADM will affect a portion 1102 of the maximum amplitude 1103 of signal 1115.

Figure 12:
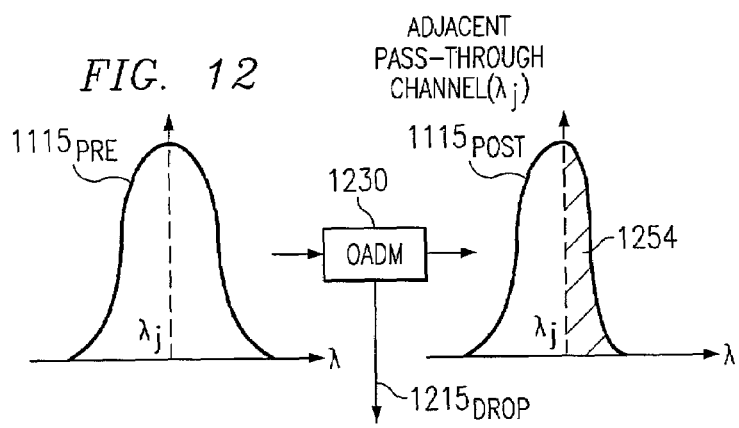
FIG. 12 is a graphic representation of a signal adjacent to an added/dropped signal before and after passing through an OADM.

FIG. 12 is a graphic representation of adjacent signal 1115 before and after passing through an OADM. In this example, line $1115_{PRE}$ represents a wavelength signal adjacent to the wavelength signal or band of signals $1215_{DROP}$ selected to be dropped by OADM 1230. Line $1115_{POST}$ represents the resulting adjacent signal after the wavelength signal or band of signals $1215_{DROP}$ adjacent to signal 1115 is dropped in OADM 1230. In this example, signal $1215_{DROP}$ comprises a longer wavelength signal than signal 1115.

This figure shows a reduction in the energy of signal 1115 after passing through OADM 1230 as a result of the overlap between filter function 1132 and the signal spectrum of signal 1115. As shown here, because the dropped signal $1215_{DROP}$ was adjacent to signal 1115 and lower in frequency than signal 1115, the higher frequency portion 1254 of signal 1115 is distorted due to interaction with filter function 1132 acting on adjacent dropped wavelength signal $1215_{DROP}$.

The spectral distortion of some of the frequency components of the pass-through signal spectrum adjacent to the dropped wavelength signals affects the intensity of the adjacent pass-through channels and leads to asymmetry in the adjacent channel. The spectral distortion attributable to asymmetry can be expressed mathematically as:

$$\text{Asymmetry} = \text{Energy}_{LOWER\ FREQUENCY} / \text{Energy}_{HIGHER\ FREQUENCY}$$

The spectral distortion attributable to asymmetry tends to increase with an increase in the number of channels used in the system. In general, the closer the channel spacing, the greater the affects of asymmetry on the adjacent pass-through channels.

Another aspect of this disclosure recognizes chromatic dispersion associated with OADMs as a source of spectral distortion. Chromatic dispersion can be introduced into pass-through wavelength signals adjacent to the signals or bands dropped by the OADM. In a system using a plurality of OADMs in an optical communications link, and in particular those systems using fixed wavelength OADMs, significant dispersion can accumulate in wavelength signals adjacent to those signals being dropped. Using band OADMs with sacrificial guard-channels between bands of information bearing channels decreases the aggregate chromatic dispersion introduced.

Figure 13:
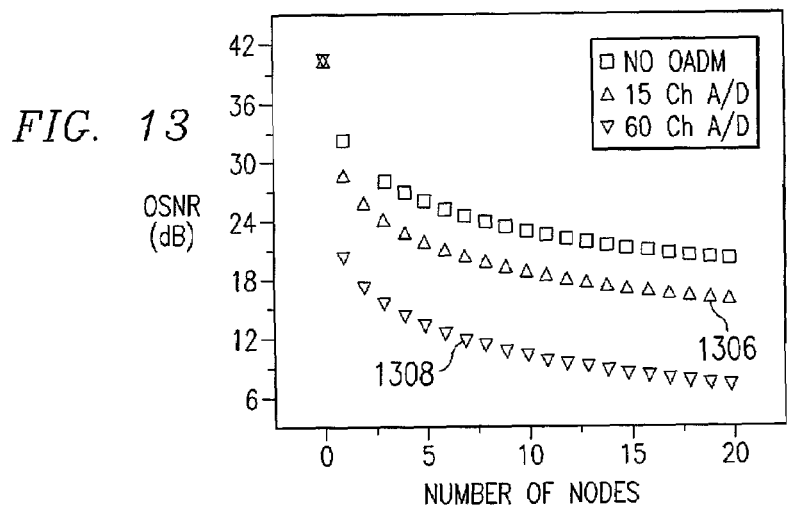
FIG. 13 is a graph showing how spectral distortion associated with channel-by-channel OADMs can affect the optical signal-to-noise ratio of an optical communications system.

Still another source of spectral distortion can arise as a result of a decreased optical signal-to-noise ratio. FIG. 13 is a graph showing how spectral distortion associated with channel-by-channel OADMs can affect the optical signal-to-noise ratio of an optical communications system. This example assumes a twenty (20) span optical communication link including, between each pair of spans, a node comprising a channel-by-channel OADM. The horizontal axis of FIG. 13 provides the maximum number of nodes that the system can support while maintaining a desired optical signal-to-noise ratio. In this example, lines 1306 and 1308 represent channel-by-channel OADMs supporting 15 and 60 channels, respectively.

As shown in this figure, a system that does not implement any optical add/drop multiplexers can maintain an optical signal-to-noise ratio of approximately 18 decibels over at least twenty (20) spans. The same system supporting 15 channels and incorporating channel-by-channel OADMS, can only drop the same channel at eleven (11) nodes while maintaining a signal-to-noise-ratio of 18 decibels. This metric gets worse as channel spacing decreases and the number of channels added and/or dropped increases. For example, the same system supporting 60 channels, can only drop the same channel at two (2) nodes while maintaining a signal-to-noise-ratio of 18 decibels.

FIG. 13 shows that for a desired optical signal-to-noise ratio, the number of channel-by-channel OADMs is quite limited. This limitation occurs because each time an optical signal passes through a channel-by-channel OADM that drops an adjacent channel to the pass-through signal, the pass-through signal experiences asymmetry, loss, and chromatic dispersion penalties. These penalties adversely affect the intensity of the pass-through channels, requiring the use of optical amplifiers to at least partially compensate for those penalties. Optical amplifiers tend to introduce noise into the system, which degrades the optical signal-to-noise ratio of the system.

If the system included channel-by-channel OADMs in each node without any other margin enhancing techniques, the system would experience significant spectral distortion due to asymmetry and chromatic dispersion penalties, and would experience a poor optical signal-to-noise ratio as a result of the many optical amplifiers that would be needed to offset the asymmetry and chromatic dispersion penalties. The reach of the communication system would, therefore, be quite limited.

FIGS. 11–13 collectively show how implementing multiple channel-by-channel OADMs can result in asymmetry, chromatic dispersion, and loss of signal-to-noise ratio that significantly degrades the system performance. One aspect of at least some embodiments disclosed herein recognizes that reducing spectral distortion in pass-through wavelength signals can be as important as reducing insertion losses in those signals. Various embodiments described herein can achieve reduced spectral distortion in numerous ways.

System margin can be enhanced by reducing spectral distortion by reducing the number of times that any one signal experiences an adjacent signal being added/dropped. This can be done, for example, by simultaneously adding/dropping a band of wavelength signals at each OADM. Throughout this disclosure the terms "add/drop," "adding/dropping," and "added/dropped" refer to either the operation of adding one or more wavelength signals, dropping one or more wavelength signals, or adding wavelength signals and dropping others. Those terms are not intended to require both add and drop operation, but are also not intended to exclude add and drop operations. The terms are merely used as a convenient way to refer to either adding or dropping, or both adding and dropping operations.

As used throughout this disclosure, the term "band" refers to two or more wavelength signals residing spectrally adjacent to one another. By adding/dropping one or more bands of signal wavelengths at each OADM, only wavelength signals adjacent to the spectral edges of the band are affected by asymmetry penalties and chromatic dispersion. As used throughout this disclosure, the term "spectral edge" refers to the wavelength contained within a band of wavelengths that is immediately adjacent to a wavelength not included within that particular band of wavelengths. None of the wavelength signals within the added/dropped band experience this spectral distortion.

One mechanism for reducing spectral distortion is to implement band OADMs in multiple nodes in a communication link, each capable of simultaneously adding/dropping one or more bands of information carrying wavelengths at each node. In various embodiments, the communications link can comprise up to 5, 7, 10, 12, or more band OADMs.

Another mechanism for reducing spectral distortion in a wavelength adjacent to an added/dropped wavelength is to use one or more sacrificial guard-channels between the bands of information bearing wavelength signals. As used throughout this disclosure, the term "guard-channel" refers to one or more wavelength signals that reside between information bearing bands. While a wavelength is designated as a guard-channel, that wavelength is not relied on to carry information. Instead, while wavelength signals remain designated as guard-channels, they are considered sacrificial wavelengths. That is, guard-channels are used to protect information bearing wavelength signals residing in adjacent bands from spectral distortion while traversing the OADM.

Locating guard-channels between pass-through bands of channels and added/dropped bands of channels protects pass-through and added/dropped channels from asymmetry and chromatic dispersion penalties by allowing the guard-channels to absorb those penalties. None of the wavelength signals within the pass-through channels or the added/dropped channels will experience this spectral distortion.

In various embodiments implementing band OADMs in an optical communication system, at least one band OADM is capable of providing wide bandwidth service with a low spectral distortion. In some embodiments, at least five (5) band OADMs are implemented in a multiple span communication system, each capable of adding/dropping the same band of wavelengths. This system results in a spectral distortion of no more than 3 dB after communication across the system. In other embodiments, at least ten (10) band OADMs are implemented in a multiple span communication system, resulting in a spectral distortion of no more than 3 dB in the adjacent pass-through channels after communication across the system.

In one particular embodiment, at least five (5) band OADMs are implemented in a multiple span communication system, each capable of adding/dropping the same band of wavelengths. This system can result in a signal asymmetry of, for example, less than 3 decibels per channel. In some cases, this system results in an asymmetry of less than 2.5 decibels per channel, or even less than 2.0 decibels per channel. In another embodiment, a plurality of band OADMs are implemented in a multiple span communication system, resulting in an asymmetry penalty of less than 1.0 decibels in any of the adjacent pass-through channels after passing through each band OADM. In some cases, this system results in an asymmetry of less than 0.5 decibels, or even less than 0.3 decibels in any of the adjacent pass-through channels after passing through each band OADM.

Another mechanism for enhancing system margin is to implement low loss band OADMs in a majority of nodes in an optical communications system. Low loss band OADMs can be implemented that introduce, for example, two (2) decibels or less of loss at each node. A thin film filter provides one example of a low loss band OADM capable of a loss of two (2) decibels or less.

Figure 14:
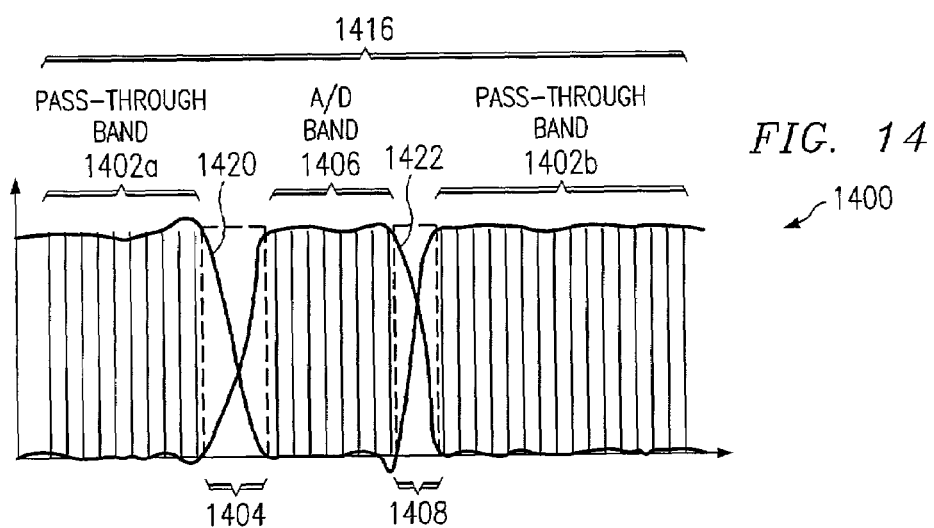
FIG. 14 is a graph showing one possible spectral response of a band OADM.

FIG. 14 is a graph showing one possible spectral response of a band OADM 1400. In this example, band OADM 1400 operates to drop band 1406 from multiple wavelength signal 1416, while allowing pass-through bands 1402a and 1402b to pass through. Lines 1420 and 1422 represent the filter function of band OADM 1400. This example further shows the use of guard-channels 1404 and 1408 between pass-through bands 1402 and add/drop band 1406. Guard-channels are used in band OADM 1400 because it can be difficult to design an OADM with a filter function that does not adversely affect at least one wavelength signal adjacent to the add/drop band 1406.

The example shown in FIG. 14 illustrates how the use of guard-channels 1404 and 1408 between pass-through bands 1402 and add/drop bands 1406 can reduce signal degradation problems in wavelength signals adjacent to the add/drop band. In this example, guard-channels 1404 and 1408 will be affected by the filter function associated with the band OADM and will protect the filter function from adversely impacting pass-through band 1402. Signals in the pass-through bands and the add/drop bands will, therefore, experience low insertion losses and little or no spectral distortion.

Figure 15:
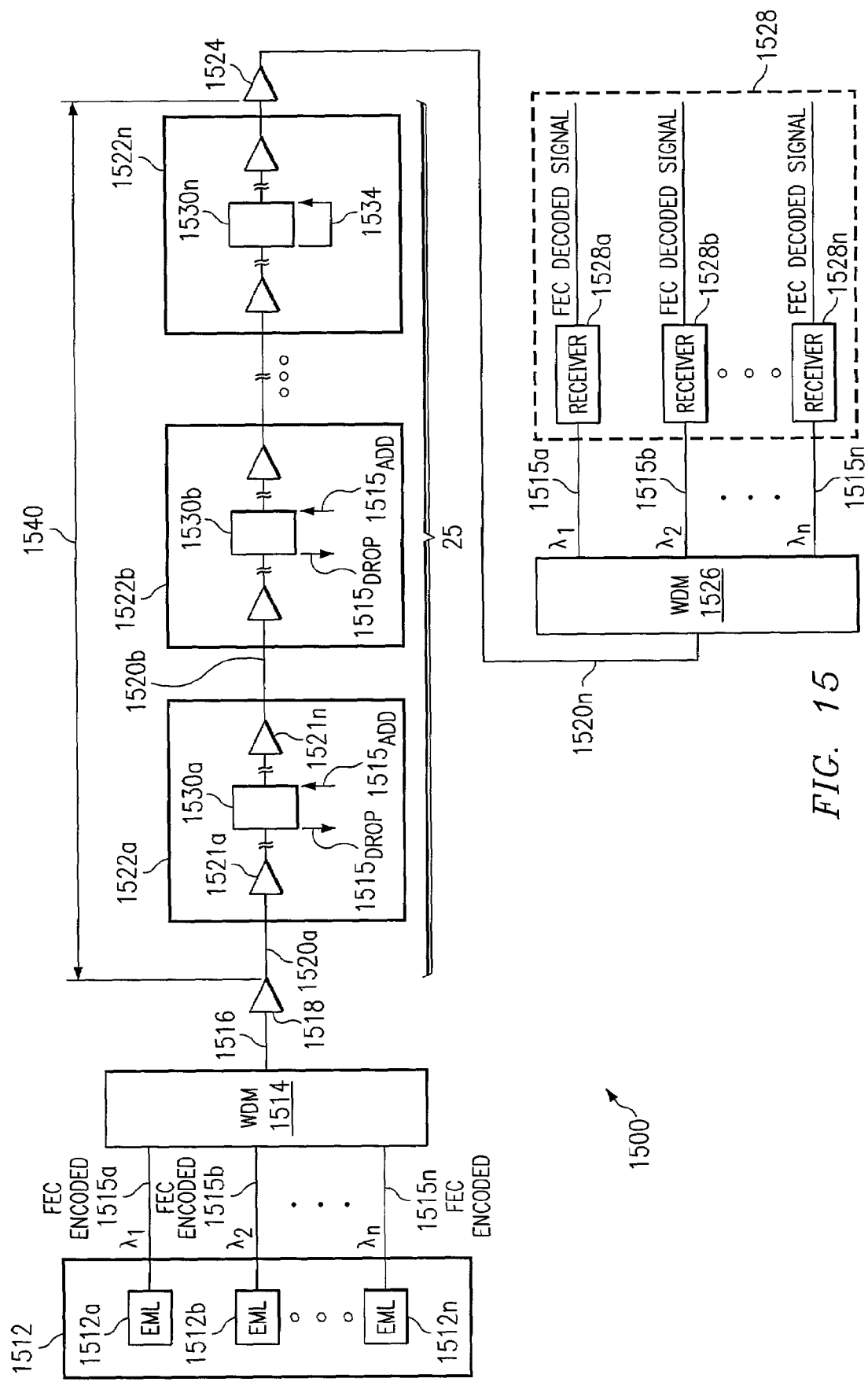
FIG. 15 is a block diagram showing at least a portion of an exemplary optical communication system operable to facilitate communication of one or more multiple wavelength signals.

FIG. 15 is a block diagram showing at least a portion of an exemplary optical communication system 1500 implementing several margin enhancing techniques. System 1500 is operable to facilitate communication of one or more multiple wavelength signals 1516. Each multiple wavelength signal 1516 comprises a plurality of optical wavelength signals (or channels) 1515a–1515n, each comprising a center wavelength of light. In the illustrated example, wavelength signals 1515a–1515n comprise a bandwidth of wavelengths of at least thirty-two (32) nanometers and comprise at least one hundred sixty (160) channels. In various embodiments, wavelength signals 1515a–1515n can comprise a bandwidth of more than sixty (60) nanometers and two hundred (200) channels or more. In some embodiments, wavelength signals 1515a–1515n can comprise a bandwidth of more than one hundred (100) nanometers and two hundred forty (240) channels or more.

In this example, system 1500 includes a transmitter assembly 1512 operable to generate the plurality of optical signals (or channels) 1515a–1515n. Transmitter assembly 1512 may comprise a portion of an optical regenerator. That is, transmitter assembly 12 may generate optical signals 1515 based on electrical representations of signals received from other optical communication links. In other cases, transmitter assembly may generate optical signals 1515 based on information received from sources residing locally to transmitters 1512.

At least a majority of transmitters 1512 in system 1500 comprise electro-absorption modulated lasers (EML) capable of modulating at 9.5 gigabits per second or more. In this embodiment, each EML 1512 comprises a laser diode and an electro-absorption modulator (EAM) located on a common substrate. Locating the laser diode and the EAM on a common substrate is advantageous in allowing relatively inexpensive packaging of EMLs by facilitating formation of arrays of EMLs. In addition, EML's facilitate the use of low drive voltages to modulate the signals.

To improve system margin, at least a majority of transmitters 1512 encode a forward error correction (FEC) sequence onto their respective optical signals 1515. Encoding the FEC sequence onto each signal 1515 increases the system's tolerance to errors and improves the Q-factor associated with signals 1515. In this embodiment, system 1500 communicates wavelength signals 1515 encoded with the FEC sequence across system 1500 while maintaining a bit error rate of $10^{-09}$ or better and improves the Q-factor of signals 1515 by at least six (6) decibels after forward error correction decoding.

In the illustrated embodiment, system 1500 also includes a combiner 1514 operable to receive wavelength signals 1515a–1515n and to combine those signals into a multiple wavelength signal 1516. In this example, combiner 1514 comprises a wavelength division multiplexer (WDM).

System 1500 communicates multiple wavelength signal 1516 over an optical communication medium 1520. Communication medium 1520 can comprise a plurality of spans 1520a–1520n of fiber. Fiber spans 1520a–1520n could comprise standard single mode fiber (SMF), dispersion-shifted fiber (DSF), non-zero dispersion-shifted fiber (NZDSF), dispersion compensating fiber (DCF), or another fiber type or combination of fiber types.

In the illustrated embodiment, each span 1520 couples to or comprises at least one stage of an optical amplifier. In this example, at least a majority of spans 1520a–1520n serve as distributed Raman amplification stages, assisting in offsetting losses that would otherwise be experienced by optical signals 1515 traversing system 1500. In those spans serving as both a transmission medium and an amplification stage, the fiber is pumped to generate Raman gain along at least a portion of the span.

In the illustrated example, communication medium 1520 includes a single optical link 1525 comprising numerous spans 1520a–1520n. System 1500 could include any number of additional links coupled to link 1525. In this example, multiple wavelength signal 1516 is communicated over optical link 1525 a link distance 1540. In this example, link distance 1540 comprises a distance of more than 400 kilometers.

Multiple wavelength signal 1516 carries wavelength signals 1515a–1515n ranging across a bandwidth of at least thirty-two (32) nanometers. In this example, system 1500 includes a booster amplifier 1518 operable to receive and amplify wavelengths of signal 1516 in preparation for transmission over a communication medium 1520. System 1500 also includes a preamplifier 1524 operable to amplify signal 1516 received from a final fiber span 1520n. Amplifiers 1518 and 1524 can each comprise a wide band amplifier or a parallel combination of narrower band amplifiers.

System 1500 also includes one or more in-line amplifiers 1522a–1522n. In-line amplifiers 1522 couple to one or more spans 1520a–1520n and operate to amplify signal 1516 as it traverses communication medium 1520. In this example, a majority of in-line amplifiers 1522 comprise amplifiers operable to amplify all signal wavelengths received without using signal separation and signal combiners surround the amplifier.

In the illustrated embodiment, system 1500 also includes a plurality of band optical add/drop multiplexers (OADMs) 1530, each operable to approximately simultaneously drop one or more bands of signals $1515_{DROP}$ from multiple wavelength signal 1516. Band OADM 1530 is also operable to approximately simultaneously add one or more bands of signals $1515_{ADD}$ to multiple wavelength signal 1516. In this particular embodiment, each of band OADMs 1530 comprises a low loss thin film filter. As used throughout this document the term "low loss thin film filter" refers to an OADM with 2 decibels of loss or less. In this example, link 1525 supports at least five (5) band OADMs 1530.

In this example, each of the plurality of band OADMs 1530 reside mid-stage within in-line amplifiers 1521a–1521n. This example advantageously locates each OADM after first stage 1521a of the multiple stage in-line amplifier, and before last stage 1521n of the amplifier. This helps to avoid degrading the optical signal-to-noise ratio and reduces non-linearity penalties.

Not all band OADMs 1530 in system 1500 need be operational at any given time. The embodiment shown in FIG. 15 provides the ability to bypass some or all add/drop functionality by implementing a removable short circuit 1534 coupled between a drop port and an add port of OADM 1530n. If and when it is determined that add/drop functionality is desired at OADM 1530n, short circuit 1534 can be removed, for example, by cutting circuit 1534 to open access to the drop and add ports of OADM 1530n.

Band OADMs 1530 that are not short-circuited are each capable of dropping and/or adding one or more bands of wavelengths diverted from communication link 1520. As discussed above, utilizing band OADMs to process information bearing bands, each separated by one or more sacrificial guard-channels reduces spectral distortion experienced by information carrying bands. Some embodiments described herein can approximately simultaneously drop and/or add a plurality of bands at one node. This can provide advantages of further reducing spectral distortion among added/dropped wavelength signals.

System 1500 also includes one or more dispersion compensation techniques capable of at least partially compensating for chromatic dispersion associated with optical signals 1515a–1515n. In this example, at least some of amplifiers 1518, 1522, and 1524 implementing discrete Raman amplification, distributed Raman amplification, or a combination of the two, use a length of dispersion compensating fiber as at least a portion of a gain medium. Using dispersion compensating fiber as at least part of the gain medium within a Raman amplifier at least partially offsets losses associated with the dispersion compensating fiber. In this particular embodiment, using dispersion compensating fiber produces an at least transparent affect on system margin. That is, a gain associated with the Raman amplifier at least completely offsets any losses attributable to the dispersion compensating fiber.

System 1500 also includes a separator 1526 operable to separate individual optical signal 1515a–1515n from multiple wavelength signal 1516 received at the end of link 1525. Separator 1526 can communicate individual signal wavelengths or ranges of wavelengths to a bank of receivers 1528 and/or other optical communication paths. In this example, separator 1526 comprises a wavelength division demultiplexer (WDM). Receivers 1528 decode the FEC encoded signals 1515 received. The FEC decoded signals 1515 comprise a bit error rate of $10^{-9}$ or better.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. An optical communication system comprising:
   a plurality of optical transmitters operable to generate alone or collectively a plurality of wavelength signals at a bit rate of at least 9.5 gigabits per second and to communicate the plurality of wavelength signals over a multiple span communication link spanning at least 400 kilometers without optical regenerators, wherein the plurality of wavelength signals comprise a bandwidth of at least sixty-five (65) nanometers separated into at least 160 optical channels, and wherein at least a majority of the transmitters implement a forward error correction (FEC) coding technique and communicate to the communication link FEC encoded wavelength signals, and wherein the FEC encoded wavelength signals comprise a bit error rate of 10–09 or better after FEC decoding at a receiver coupled to the communication link;
   at least five (5) optical add/drop multiplexers (OADMs), each coupled to one or more spans of the multiple span communication link;
   a plurality of discrete amplifiers each coupled to one or more spans of the communication link, at least one of the plurality of discrete amplifiers comprising a discrete multi-stage Raman amplifier, the discrete multi-stage Raman amplifier comprising at least a first Raman amplification stage and a second Raman amplification stage, wherein the second Raman amplification stage is cascaded with the first Raman amplification stage, wherein each of the first Raman amplification stage and the cascaded second Raman amplification stage operate to amplify substantially all of the at least 160 optical channels of the bandwidth of at least sixty-five (65) nanometers of the plurality of wavelength signals, and wherein each of the at least 160 optical channels amplified by the discrete multi-stage Raman amplifier is separated from any adjacent optical channel within the at least 160 optical channels by a spacing of no more than 0.4 nanometers; and
   a plurality of distributed Raman amplification stages each coupled to at least one of the plurality of discrete amplifiers.

2. The optical communication system of claim 1, wherein at least one of the plurality of transmitters comprises an electro-absorption modulated laser.

3. The optical communication system of claim 2, wherein the electro-absorption modulated laser comprises a laser diode and an electro-absorption modulator residing on a common substrate.

4. The optical communication system of claim 2, wherein the forward error correction technique results in a coding gain capable of at least partially compensating for a chirp generated by the electro-absorption modulated laser.

5. The optical communication system of claim 1, wherein at least one of the at least five (5) OADMs comprises a band OADM.

6. The optical communication system of claim 5, wherein the band OADM comprises a thin film filter.

7. The optical communication system of claim 1, wherein at least one of the at least five OADMs is coupled mid-stage in a multiple stage amplifier coupled to one or more spans of the multiple span communication link.

8. The optical communication system of claim 1, wherein at least some of the first and second Raman amplification stages comprise a dispersion compensating fiber operating as a gain medium and a dispersion compensating element.

9. The optical communication system of claim 1, wherein the discrete multi-stage Raman amplifier generates an approximately flat gain profile over the bandwidth of at least sixty-five (65) nanometers.

10. The optical communication system of claim 1, wherein the discrete multi-stage Raman amplifier comprises three at least one additional amplification stage.

11. The optical communication system of claim 1, wherein the discrete multi-stage Raman amplifier comprises a dispersion compensating fiber operating as a gain medium and a dispersion compensating element.

12. The optical communication system of claim 1, wherein the at least a majority of the plurality of discrete amplifiers operate on the plurality of signal wavelengths without first passing the plurality of signal wavelengths through a signal separator in the communication link.

13. The optical communication system of claim 1, wherein at least one of the plurality of discrete amplifiers comprises:
   a signal separator operable to separate the plurality of wavelengths into a first plurality of wavelengths and a second plurality of wavelengths;
   a first amplifier operable to amplify the first plurality of wavelengths;
   a second amplifier operable to amplify the second plurality of wavelengths; and
   a signal combiner operable to combine the first and second pluralities of wavelengths received from the first and second amplifiers.

14. An optical communication system comprising:
   a plurality of optical transmitters operable to generate alone or collectively a plurality of wavelength signals at a bit rate of at least 9.5 gigabits per second and to communicate the plurality of wavelength signals over a multiple span communication link spanning at least 400 kilometers without optical regenerators, wherein the plurality of wavelength signals comprise a bandwidth of at least sixty-five (65) nanometers separated into at least 160 optical channels, and wherein at least a majority of the transmitters implement a forward error correction (FEC) coding technique and communicate to the communication link FEC encoded wavelength signals, and wherein the FEC encoded wavelength signals comprise a bit error rate of 10–09 or better after FEC decoding at a receiver coupled to the communication link;
   at least five (5) optical add/drop multiplexers (OADMs), each coupled to one or more spans of the multiple span communication link and each imparting no more than two decibels of loss to any of the plurality of wavelength signals; and a plurality of discrete amplifiers each coupled to one or more spans of the communication link, at least one of the plurality of discrete amplifiers comprising a discrete multi-stage Raman amplifier, the discrete multi-stage Raman amplifier comprising at least a first Raman amplification stage and a second Raman amplification stage, at least the first Raman amplification stage comprising a dispersion compensating fiber operating as a Raman gain medium and a dispersion compensating element, wherein the second Raman amplification stage is cascaded with the first Raman amplification stage, wherein each of the first Raman amplification stage and the cascaded second Raman amplification stage operate to amplify substantially all of the at least 160 optical channels of the bandwidth of at least sixty-five (65) nanometers of the plurality of wavelength signals, wherein each of the at least 160 optical channels amplified by the discrete multi-stage Raman amplifier is separated from any adjacent optical channel within the at least 160 optical channels by a spacing of no more than 0.4 nanometers, and wherein at least one of the first or second Raman amplification stages comprises a dispersion compensating fiber.

15. The optical communication system of claim 14, wherein at least one of the plurality of transmitters comprises an electro-absorption modulated laser.

16. The optical communication system of claim 15, wherein the forward error correction technique results in a coding gain capable of at least partially compensating for a chirp generated by the electro-absorption modulated laser.

17. The optical communication system of claim 14, wherein each of the at least five (5) OADMs comprises a band OADM.

18. The optical communication system of claim 17, wherein the band OADM comprises a thin film filter.

19. The optical communication system of claim 14, wherein each of the at least five (5) OADMs imparts to all of the plurality of wavelength signals a cumulative loss of no more than two (2) decibels.

20. The optical communication system of claim 14, wherein at least one of the at least five OADMs is coupled mid-stage in a multiple stage amplifier coupled to one or more spans of the multiple span communication link.

21. An optical communication system comprising:
a plurality of optical transmitters operable to generate alone or collectively a plurality of wavelength signals at a bit rate of at least 9.5 gigabits per second and to communicate the plurality of wavelength signals over a multiple span communication link spanning at least 400 kilometers without optical regenerators, wherein the plurality of wavelength signals comprise a bandwidth of at least sixty-five (65) nanometers separated into at least 160 optical channels, and wherein at least a majority of the transmitters implement a forward error correction (FEC) coding technique and communicate to the communication link FEC encoded wavelength signals, and wherein the FEC encoded wavelength signals comprise a bit error rate of 10–09 or better after FEC decoding at a receiver coupled to the communication link;
at least five (5) optical add/drop multiplexers (OADMs), each coupled to one or more spans of the multiple span communication link; and
a plurality of amplifiers each coupled to one or more spans of the communication link, each of at least a majority of the amplifiers comprise a multi-stage Raman amplifier including a gain medium comprising a length of dispersion compensating fiber, the multi-stage Raman amplifier comprising at least a distributed Raman amplification stage coupled to a first discrete Raman amplification stage and a second discrete Raman amplification stage, the second discrete Raman amplification stage cascaded with the first discrete Raman amplification stage, wherein each of the first Raman amplification stage and the cascaded second Raman amplification stage operate to amplify substantially all of the at least 160 optical channels of the bandwidth of at least sixty-five (65) nanometers of the plurality of wavelength signals, and wherein each of the at least 160 optical channels amplified by the discrete multi-stage Raman amplifier is separated from any adjacent optical channel within the at least 160 optical channels by a spacing of no more than 0.4 nanometers.

22. The optical communication system of claim 21, wherein at least one of the plurality of transmitters comprises an electro-absorption modulated laser.

23. The optical communication system of claim 22, wherein the forward error correction technique results in a coding gain capable of at least partially compensating for a chirp generated by the electro-absorption modulated laser.

24. The optical communication system of claim 21, wherein at least one of the at least five (5) OADMs comprises a band OADM.

25. The optical communication system of claim 21, wherein at least a portion of the distributed Raman amplification stage comprises the dispersion compensating fiber.

26. The optical communication system of claim 21, wherein the dispersion compensating fiber comprises at least part of the gain medium of the first discrete Raman amplification stage.

27. The optical communication system of claim 21, wherein the length of dispersion compensating fiber is operable to offset at least a portion of chromatic dispersion and at least a portion of losses that would otherwise affect at least some of the plurality of wavelength signals.

28. The optical communication system of claim 21, wherein each stage of the multi-stage Raman amplifier offsets at least five (5) decibels of loss.

29. The optical communication system of claim 21, wherein at least one of the at least five OADMs is coupled mid-stage in a multiple stage amplifier coupled to one or more spans of the multiple span communication link.

30. The optical communication system of claim 29, wherein each of the majority of amplifiers comprise a multiple stage amplifier, wherein the multiple stage amplifier generates an approximately flat gain profile over the plurality of wavelength signals.

31. An optical communication system comprising:
a plurality of optical transmitters operable to generate alone or collectively a plurality of wavelength signals at a bit rate of at least 9.5 gigabits per second and to communicate the plurality of wavelength signals over a multiple span communication link spanning at least 400 kilometers without optical regenerators, wherein the plurality of wavelength signals comprise a bandwidth of at least sixty-five (65) nanometers separated into at least 160 optical channels, and wherein at least a majority of the transmitters implement a forward error correction (FEC) coding technique and communicate to the communication link FEC encoded wavelength signals, and wherein the FEC encoded wavelength signals comprise a bit error rate of 10–09 or better after FEC decoding at a receiver coupled to the communication link;

at least five (5) optical add/drop multiplexers (OADMs), each coupled to one or more spans of the multiple span communication link and each imparting no more than two decibels of loss to any of the plurality of wavelength signals; and a plurality of discrete Raman amplifiers each coupled to one or more spans of the communication link, at least one of the discrete Raman amplifiers comprising at least a first Raman amplification stage and a second Raman amplification stage, the second Raman amplification stage cascaded with the first Raman amplification stage, wherein the at least one of the plurality of discrete Raman amplifiers operates to amplify substantially all of the at least 160 optical channels of the bandwidth of at least sixty-five (65) nanometers of the plurality of wavelength signals without first passing the plurality of signal wavelengths through a signal separator coupled to the communication link, and wherein each of the at least 160 optical channels amplified by the at least one discrete Raman amplifier is separated from any adjacent optical channel within the at least 160 optical channels by a spacing of no more than 0.4 nanometers.

32. The optical communication system of claim 31, wherein at least one of the plurality of transmitters comprises an electro-absorption modulated laser.

33. The optical communication system of claim 31, wherein each of the at least five (5) OADMs comprises a band OADM.

34. The optical communication system of claim 31, wherein the plurality of wavelength signals comprise a plurality of bands of wavelength signals separated by one or more guard-channels, wherein each of the at least five (5) OADMs is operable to receive the plurality of bands and to add/drop at least one band of wavelength signals to/from the plurality of wavelength signals.

35. The optical communication system of claim 31, wherein the first Raman amplification stage comprises a gain medium that includes a dispersion compensating fiber.

36. The optical communication system of claim 35, wherein the first Raman amplification stage comprising a gain medium that includes the dispersion compensating fiber is operable to offset at least a portion of chromatic dispersion and at least a portion of losses that would otherwise affect at least some of the plurality of wavelength signals.

37. The optical communication system of claim 31, wherein the at least one discrete Raman amplifier generates an approximately flat gain profile over the plurality of wavelength signals within the bandwidth of at least sixty-five (65) nanometers.

38. A method of communicating optical signals, the method comprising:

generating a plurality of wavelength signals at a rate of at least 9.5 gigabits per second, wherein the plurality of wavelength signals comprise a bandwidth of at least sixty-five (65) nanometers separated into at least 160 optical channels;

encoding a forward error correction (FEC) sequence onto at least a majority of plurality of wavelength signals, wherein the FEC encoded wavelength signals comprise a bit error rate of 10–09 or better after FEC decoding;

communicating the plurality of wavelength signals to a multiple span communication link spanning at least 400 kilometers without optical regenerators;

adding/dropping one or more of the plurality of wavelength signals at at least five optical add/drop multiplexers (OADMs) coupled to multiple span communications link; and amplifying the plurality of wavelength signals at a plurality of discrete amplification sites, at least one of the plurality of discrete amplification sites comprising a discrete multi-stage Raman amplifier, the discrete multi-stage Raman amplifier comprising at least a first Raman amplification stage and a second Raman amplification stage, wherein the second Raman amplification stage is cascaded with the first Raman amplification stage, wherein each of the first Raman amplification stage and the cascaded second Raman amplification stage operate to amplify substantially all of the at least 160 optical channels of the bandwidth of at least sixty-five (65) nanometers of the plurality of wavelength signals, and wherein each of the at least 160 optical channels amplified by the multi-stage discrete Raman amplifier is separated from any adjacent optical channel within the at least 160 optical channels by a spacing of no more than 0.4 nanometers.

39. The method of communicating of claim 38, wherein at least one of the plurality of wavelength signals is generated by an electro-absorption modulated laser.

40. The method of communicating of claim 38, wherein at least one of the at least five (5) OADMs comprises a band OADM.

41. The method of communicating of claim 38, wherein the at least one of the plurality of discrete amplification sites generates an approximately flat gain profile over the plurality of wavelength signals.

42. The method of communicating of claim 41, wherein the discrete multi-stage Raman amplifier comprises at least one additional amplification stage.

43. The method of communicating of claim 41, wherein the first Raman amplification stage comprises a dispersion compensating fiber operating as a gain medium and a dispersion compensating element.

44. The method of communicating of claim 38, wherein the at least one of the plurality of discrete amplification sites operates to amplify the plurality of signal wavelengths without first passing the plurality of signal wavelengths through a signal separator in the communication link.

45. A method of communicating optical signals, the method comprising:

generating a plurality of wavelength signals at a rate of at least 9.5 gigabits per second, wherein the plurality of wavelength signals comprise a bandwidth of at least sixty-five (65) nanometers separated into at least 160 optical channels;

encoding a forward error correction (FEC) sequence onto at least a majority of plurality of wavelength signals, wherein the FEC encoded wavelength signals comprise a bit error rate of 10–09 or better after FEC decoding;

communicating the plurality of wavelength signals through a multiple span communication link spanning at least 400 kilometers without optical regenerators;

adding/dropping at least one of the plurality of wavelength signals at at least five optical add/drop multiplexers (OADMs) as the signal traverses the multiple span communications link, wherein each time the at least one wavelength signal is added/dropped, a loss of no more than two decibels is imparted to any of the plurality of wavelength signals; and amplifying the plurality of wavelength signals at a plurality of discrete amplification sites, at least one of the plurality of discrete amplification sites comprising a discrete multi-stage Raman amplifier, the discrete multi-stage Raman amplifier comprising at least a first Raman amplification stage and a second Raman amplification stage, at least the first Raman amplification stage comprising a dispersion compensating fiber operating as a Raman gain medium and a dispersion compensating element, wherein the second Raman amplification stage is cascaded with the first Raman amplification stage, wherein each of the first Raman amplification stage and the cascaded second Raman amplification stage operate to amplify substantially all of the at least 160 optical channels of the bandwidth of at least sixty-five (65) nanometers of the plurality of wavelength signals, wherein at least one of the first and second Raman amplification stages comprises a dispersion compensating fiber, and wherein each of the at least 160 optical channels amplified by the multi-stage discrete Raman amplifier is separated from any adjacent optical channel within the at least 160 optical channels by a spacing of no more than 0.4 nanometers.

46. The method of communicating of claim 45, wherein at least one of the plurality of wavelength signals is generated by an electro-absorption modulated laser.

47. The method of communicating of claim 45, wherein at least one of the at least five (5) OADMs comprises a band OADM.

48. The method of communicating of claim 47, wherein the band OADM comprises a thin film filter.

49. The method of communicating of claim 45, wherein the plurality of wavelength signals comprise a plurality of bands of wavelength signals separated by one or more guard-channels, wherein each of the at least five (5) OADMs is operable to receive the plurality of bands and to add/drop at least one band of wavelength signals to/from the plurality of wavelength signals.

50. The method of communicating of claim 49, wherein each band comprises at least two (2) wavelengths.

51. The method of communicating of claim 49, wherein each band is separated from an adjacent band by at least two (2) guard-channels.

52. The method of communicating of claim 45, wherein at least one of the at least five OADMs is coupled mid-stage in a multiple stage amplifier coupled to one or more spans of the multiple span communication link.

53. The method of communicating of claim 45, wherein each of the majority of amplifiers comprise a multiple stage amplifier, wherein the multiple stage amplifier generates an approximately flat gain profile over the plurality of wavelength signals.

54. A method of communicating optical signals, the method comprising:
  generating a plurality of wavelength signals at a rate of at least 9.5 gigabits per second, wherein the plurality of wavelength signals comprise a bandwidth of at least sixty-five (65) nanometers separated into at least 160 optical channels;
  encoding a forward error correction (FEC) sequence onto at least a majority of plurality of wavelength signals, wherein the FEC encoded wavelength signals comprise a bit error rate of 10–09 or better after FEC decoding;
  communicating the plurality of wavelength signals through a multiple span communication link spanning at least 400 kilometers without optical regenerators;
  adding/dropping one or more of the plurality of wavelength signals at at least five optical add/drop multiplexers (OADMs) coupled to multiple span communications link; and
  amplifying the plurality of wavelength signals at a plurality of amplification sites, wherein each of at least a majority of the amplification sites comprise a multi-stage Raman amplifier comprising at least a distributed Raman amplification stage coupled to a first discrete Raman amplification stage and a second discrete Raman amplification stage, the second discrete Raman amplification stage cascaded with the first discrete Raman amplification stage, the distributed Raman amplification stage including a gain medium comprising a length of dispersion compensating fiber, wherein each of the first Raman amplification stage and the cascaded second Raman amplification stage operate to amplify substantially all of the at least 160 optical channels of the bandwidth of at least sixty-five (65) nanometers of the plurality of wavelength signals, and wherein each of the at least 160 optical channels amplified by the multi-stage discrete Raman amplifier is separated from any adjacent optical channel within the at least 160 optical channels by a spacing of no more than 0.4 nanometers.

55. The method of communicating of claim 54, wherein at least one of the plurality of wavelength signals is generated by an electro-absorption modulated laser.

56. The method of communicating of claim 54, wherein at least one of the at least five (5) OADMs comprises a band OADM.

57. The method of communicating of claim 54, wherein the dispersion compensating fiber comprises at least a portion of the multiple span communication link.

58. The method of communicating of claim 54, wherein the first discrete Raman amplification stage comprises a gain medium that includes a second dispersion compensating fiber.

59. The method of communicating of claim 54, wherein the dispersion compensating fiber is operable to offset at least a portion of chromatic dispersion and at least a portion of losses that would otherwise affect at least some of the plurality of wavelength signals.

60. The method of communicating of claim 54, wherein at least one of the at least five OADMs is coupled mid-stage in a multiple stage amplifier coupled to one or more spans of the multiple span communication link.

61. The method of communicating of claim 54, wherein each of the majority of amplifiers comprise a multiple stage amplifier, wherein the multiple stage amplifier generates an approximately flat gain profile over the plurality of wavelength signals.

* * * * *